United States Patent
Caretta

(10) Patent No.: US 6,789,590 B2
(45) Date of Patent: *Sep. 14, 2004

(54) METHOD OF MANUFACTURING A TIRE INCLUDING CARCASS PLY TERMINAL ZONES ENGAGED WITH RESPECTIVE ANNULAR REINFORCING STRUCTURES, THE TIRE, AND WHEEL INCLUDING THE TIRE

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 126 days.

This patent is subject to a terminal disclaimer.

(21) Appl. No.: 09/729,278

(22) Filed: Dec. 5, 2000

(65) Prior Publication Data

US 2002/0023700 A1 Feb. 28, 2002

Related U.S. Application Data

(63) Continuation of application No. PCT/EP99/03664, filed on May 27, 1999.
(60) Provisional application No. 60/089,288, filed on Jun. 15, 1998, provisional application No. 60/121,054, filed on Feb. 22, 1999, provisional application No. 60/125,934, filed on Mar. 23, 1999, and provisional application No. 60/127,585, filed on Apr. 2, 1999.

(30) Foreign Application Priority Data

| Jun. 5, 1998 | (EP) | 98110354 |
| Jan. 22, 1999 | (EP) | 99830021 |
| Feb. 5, 1999 | (EP) | 99830063 |
| Feb. 16, 1999 | (EP) | 99103044 |

(51) Int. Cl.$^7$ .......... B29D 30/42; B60C 15/00; B60C 15/02; B60C 15/06; B60C 5/22

(52) U.S. Cl. .......... 152/339.1; 152/539; 152/544; 152/547; 152/550; 152/552; 156/133; 156/135

(58) Field of Search .......... 152/544, 539, 152/547, 540, 545, 548, 550, 552, 558, 560, 339.1; 156/133, 135

(56) References Cited

U.S. PATENT DOCUMENTS

| 1,875,893 A | 9/1932 | Shoemaker |
| 2,966,933 A | 1/1961 | Boussu et al. |

(List continued on next page.)

FOREIGN PATENT DOCUMENTS

EP 0780221 A2 6/1997

(List continued on next page.)

OTHER PUBLICATIONS

U.S. patent application Ser. No. 09/364,099, Caretta, filed Jul. 30, 1999.

Primary Examiner—Adrienne C. Johnstone
(74) Attorney, Agent, or Firm—Finnegan, Henderson, Farabow, Garrett & Dunner, L.L.P.

(57) ABSTRACT

A method of manufacturing a tire for a vehicle wheel includes making a carcass structure, applying a belt structure to the carcass structure, applying a tread band to the belt structure, and applying at least one pair of sidewalls to the carcass structure. Making the carcass structure includes applying at least one first part of the at least one carcass ply on a toroidal support, applying at least one circumferentially-inextensible annular anchoring insert, and applying at least one stiffening element. The at least one annular anchoring insert includes a cross-sectional profile of flattened conformation, extending away from an equatorial plane of the tire. The at least one stiffening element includes at least one main portion with a cross-sectional profile tapering away from a rotation axis of the tire. The at least one main portion is located substantially at an axially-inner position relative to the at least one annular anchoring insert.

48 Claims, 10 Drawing Sheets

U.S. PATENT DOCUMENTS

| | | |
|---|---|---|
| 3,072,171 A | 1/1963 | Drakeford et al. |
| 3,240,250 A | 3/1966 | Frazier |
| 4,248,287 A | 2/1981 | Christman |
| 5,453,140 A | 9/1995 | Laurent et al. |
| 5,634,993 A | 6/1997 | Drieux et al. |
| 5,702,548 A | 12/1997 | Arnaud et al. |
| 5,971,047 A | 10/1999 | Drieux et al. |
| 6,318,432 B1 | 11/2001 | Caretta et al. |
| 6,328,084 B1 | 12/2001 | Caretta et al. |
| 6,357,502 B1 * | 3/2002 | Caretta .................. 152/544 X |
| 6,457,504 B1 | 10/2002 | Caretta |
| 6,623,584 B2 | 9/2003 | Caretta |
| 2001/0023737 A1 | 9/2001 | Caretta et al. |
| 2001/0042587 A1 | 11/2001 | Caretta et al. |
| 2002/0011297 A1 | 1/2002 | Caretta et al. |
| 2002/0029841 A1 | 3/2002 | Caretta et al. |
| 2002/0056498 A1 | 5/2002 | Caretta et al. |
| 2002/0189737 A1 | 12/2002 | Caretta |
| 2004/0055688 A1 | 3/2004 | Caretta |

FOREIGN PATENT DOCUMENTS

| | | |
|---|---|---|
| EP | 0 922 592 A1 | 6/1999 |
| EP | 0 928 680 A1 | 7/1999 |
| EP | 0 928 702 A1 | 7/1999 |
| EP | 0 937 590 A1 | 8/1999 |
| EP | 0 976 535 A2 | 2/2000 |

* cited by examiner

METHOD OF MANUFACTURING A TIRE INCLUDING CARCASS PLY TERMINAL ZONES ENGAGED WITH RESPECTIVE ANNULAR REINFORCING STRUCTURES, THE TIRE, AND WHEEL INCLUDING THE TIRE

CROSS-REFERENCE TO RELATED APPLICATIONS

This application is a continuation of International Application No. PCT/EP99/03664, filed May 27, 1999, in the European Patent Office; additionally, Applicant claims the benefit under 35 U.S.C. §119(e) based on prior-filed copending, provisional application Nos. 60/089,288, filed Jun. 15, 1998, 60/121,054, filed Feb. 22, 1999, 60/125,934, filed Mar. 23, 1999, and 60/127,585, filed Apr. 2, 1999, in the U.S. Patent and Trademark Office; all of which are relied upon and incorporated herein by reference.

BACKGROUND OF THE INVENTION

1. Field of the Invention

The present invention relates to a method of manufacturing a tire for vehicle wheels, comprising the following steps: forming a carcass structure having at least one carcass ply with terminal zones engaged with respective annular reinforcing structures which are axially spaced from one another; applying a belt structure in a position circumferentially outside the carcass structure; applying a tread band in a position circumferentially outside the belt structure and at least one pair of sidewalls in laterally opposite positions on the carcass structure.

The present invention also relates to a tire for vehicle wheels which can be obtained by means of the above-mentioned method, comprising: a carcass structure having at least one carcass ply with terminal zones engaged with respective annular reinforcing structures axially spaced from one another; a belt structure applied in a position circumferentially outside the carcass structure; a tread band applied in a position circumferentially outside the belt structure; at least one pair of sidewalls applied in laterally opposite positions on the carcass structure.

The invention also relates to a tire wheel comprising a mounting rim provided with bead seats defined by frusto-conical surfaces converging towards the axis of rotation of the tire, away from the equatorial plane thereof, and a tire obtained with the method according to the invention provided with beads designed to fit precisely into the above-mentioned seats.

2. Description of the Related Art

The manufacture of tires for vehicle wheels involves the manufacturing of a carcass structure essentially composed of one or more carcass plies shaped in a substantially toroidal configuration and having its axially opposite lateral edges engaged with respective annular reinforcing structures, each of which normally comprises a circumferentially unextendable, metal, annular insert, usually called a bead core, and a filling element made of elastomeric material and combined with the bead core in a radially external position.

The carcass structure has, applied to it, in a circumferentially outer position, a belt structure comprising one or more belt layers formed in a closed ring, which are essentially made up of textile or metal cords suitably oriented relative to each other and to the cords belonging to the adjacent carcass plies. Then, at a circumferentially outer position of the belt structure a tread band is applied, which usually consists of a strip of elastomer material of suitable thickness.

It is to point out that, to the aims of the present description, by the term "elastomer material" it is intended a rubber blend in its entirety, i.e. the assembly formed of at least one base polymer suitably amalgamated with reinforcing fillers and/or process additives of various types.

Ultimately, a pair of sidewalls is applied to the opposite sides of a tire being manufactured, each of said sidewalls covering a side portion of the tire comprised between a so-called shoulder region, arranged close to the corresponding side edge of the tread band, and a so-called bead arranged at the corresponding bead core.

The traditional production methods essentially envisage that the above listed tire components are first made separately from one another, to be then assembled during a step of the tire manufacture.

Production methods have also been proposed, whereby, instead of resorting to the production of semi-finished products, part or all of the carcass structure components are made directly during the tire manufacturing steps.

For example, U.S. Pat. No. 5,453,140, discloses a method and an apparatus which form a carcass ply by laying down, on a toroidal support shaped so as to match the tire, a plurality of cord sections arranged circumferentially in side by side relationship and sequentially obtained by cutting an individual cord supplied from a reel.

For the purposes of manufacturing the annular reinforcing structures, it is also known that, in the vicinity of each of the tire beads, the opposite ends of the individual cords forming a carcass ply are arranged, in an alternate sequence, in axially opposite positions with respect to an annular anchoring insert formed substantially in the manner of a circular crown and composed of coils of metal wire arranged in concentric circumferences, as can be understood from the patent EP 0,664,231 and the patent U.S. Pat. No. 5,702,548.

In the above mentioned art, all the cords forming the carcass ply or plies are however substantially arranged along the neutral axis of resistance to bending of the respective bead. Under this circumstance, the structural strength of the beads must necessarily rely on the rigidity of the filling inserts made of very hard elastomer material incorporated into the bead structure, the behaviour of which is affected by temperature changes due both to environmental factors and to stresses induced during normal operation.

The Applicant has found that important advantages can be achieved both in terms of simplification in the production processes and in terms of improvement of the behavioural features of the tire if the carcass ply or plies are made by suitably laying down strip-like sections on a rigid toroidal support, each comprising a plurality of cords parallel to each other, incorporated into an elastomer layer.

In this connection, the Applicant has already developed different manufacturing methods being the object of respective European Patent Applications.

For instance, in European Patent Application Nos. 97830731.2 (EP 0928680) and 97830733.8 (EP 0928702) a manufacturing method and a tire are respectively disclosed in which the carcass structure is obtained by making a first and a second carcass plies, each obtained by means of strip-like sections sequentially laid down in circumferential mutual side by side relationship.

Tires obtained following the method described in such patent applications have the end portions of the strip-like sections belonging to the first and second carcass plies disposed on respectively opposite sides relative to the annular reinforcing structures of the beads.

This expedient, in combination with the respectively crossed orientation of the strip-like sections belonging to one and the other plies, offers considerable advantages in terms of structural strength of the tire close to the beads and sidewalls.

In the European Patent Application No. 98830472.1 (EP0976535), in the name of the Applicant as well, accomplishment of a carcass ply is proposed which is made by laying down a first and a second series of strip-like sections in an alternate sequence, the sections belonging to the first and second series terminating at respectively opposite sides relative to the bead reinforcing structures.

Thus, advantages can be achieved in terms of structural strength at the tire beads and sidewalls, even in the presence of a single carcass ply.

Usually tire beads, and in particular the annular reinforcing structures integrated thereinto, are conceived and shaped in a manner suitable for coupling with the respective circumferential seats provided on a rim with which the tire is to be associated, for the purpose of ensuring a steady connection between these two wheel components.

In greater detail, the engagement between each bead and the corresponding circumferential seat of the rim is such that the bead is constantly pushed, owing to the inflation pressure of the tire, against an abutment shoulder projecting radially away from the axis of rotation of the tire and defining the axially external edge of the rim. At least in tubeless tires, i.e. those without inner tubes, each circumferential seat for engagement of the bead has a frustoconical surface—usually called a "bead seat"—having an extension converging towards the rotation axis into the vicinity of the equatorial plane of the tire. Each bead, which is pushed axially away from the equatorial plane owing to the inflation pressure, acts in an axial thrust relationship against the respective bead seat so as to ensure a perfect hermetic seal for the air contained in the tire.

Recently vehicle wheels have been proposed, in which the engagement seats of the tire beads have a frustoconical shape with a progression converging towards the axis of rotation away from the equatorial plane. An example of such a rim/tire assembly is described in the American patent U.S. Pat. No. 5,634,993.

In the embodiment proposed in this patent, the tire beads, which are shaped so as to match the corresponding seats on the rim, have annular reinforcing structures comprising usual bead cores around which the terminal zones of the carcass ply are axially folded back. The carcass structure, which is of the radial type, has overall a cross-sectional profile with a constant bending direction, the tangent of which close to the bead cores is substantially parallel to the equatorial plane.

The document WO 95/23073 describes a tire with beads which are particularly suitable for use on rims with frustoconical bead seats axially turned outwardly.

In the Applicant's perception, the technical problem to be solved in this tire is that of modifying its structure so as to facilitate the production process thereof. In fact, in this tire, each terminal zone of the carcass ply is folded back axially from the outside towards the inside around an annular insert made of hard elastomeric material, the cross-sectional profile of which is substantially wedge shaped, with a base side parallel to the bead seat of the rim.

In an area close to the vertex of the wedge, the terminal zone of the ply passes, still in an axially inwards direction, around a bead core having a substantially circular cross-sectional profile. Soft-rubber filling elements are arranged in the areas surrounding the wedge-shaped annular insert and the bead core so that, following the tensioning produced along the extension of the carcass ply as a result of the inflation pressure, the bead core tends to be displaced axially towards the outside of the bead and consequently acts on an inclined surface of the wedge-shaped insert so as to increase the contact pressure of the bead against the bead seat of the rim.

The same Applicant has also proposed a tire—forming the subject of European patent application No. 98.110354.2 (EP0922592) which has beads suitable for stable anchoring onto the corresponding seats of a rim with frustoconical bead seats directed axially outwards.

SUMMARY OF THE INVENTION

In accordance with the present invention it has been found that the processes for the manufacture of tires with beads suitable for use on rims with frustoconical seats axially directed towards the outside may be significantly simplified if each bead of the tire is provided with an annular reinforcing structure having preferably a cross-sectional profile substantially in the form of an "L" with a radially external branch integral with the carcass ply or plies and a radially internal branch substantially parallel to the seat of the rim and designed to act with a thrust on the latter as a result of the tension transmitted to the carcass ply or plies.

The Applicant has in fact perceived that such a tire can be manufactured in a convenient manner by supplying the components thereof substantially in a direction radial to the axis of rotation and/or tangential with respect to the circumferential extension of the tire itself, substantially without axially directed movements, in accordance with the methods described in the above-mentioned European patent applications No. 97830731.2 (EP 0928680) and No. 97830733.8 (EP 0928702) as well as No. 98830472.1 in the name of the Applicant herself, hitherto not published.

In greater detail, the invention relates to a method of manufacturing a tire for vehicle wheels, characterized in that the manufacture of the carcass structure comprises the following steps: applying, on a toroidal support shaped so as to match the internal superficial extension of said tire, at least a first part of at least one carcass ply defining axially inner terminal zones of said at least one carcass ply; applying, radially superimposed with respect to an end portion of one or both said axially inner terminal zones, at least one circumferentially unextendable, annular, anchoring insert, having a cross-sectional profile with a flattened form extending axially away with respect to the corresponding inner terminal zone and an equatorial plane of the tire; applying, against each inner terminal zone, at least one stiffening element having at least one main portion with a cross-sectional profile tapering away from said axis of rotation, located substantially in an axially internal position with respect to said annular anchoring insert.

It is also preferable to carry out the stage of applying at least a second part of said at least one carcass ply defining axially outer terminal zones of said at least one carcass ply.

In a preferred embodiment, application of the second carcass ply part is performed after application of the stiffening element, so that the outer terminal zones are each superimposed on the respective stiffening element on the opposite side with respect to said inner terminal zone.

More particularly, the application of each annular anchoring insert is performed by means of winding of at least one elongated element in axially adjacent concentric turns around the toroidal support.

Preferably, an end portion of at least one of said outer terminal zones is arranged against an extended portion of the respective stiffening element, extending substantially parallel to said annular anchoring insert.

It is also advantageously envisaged carrying out the additional step of applying, radially superimposed on an end portion of at least one of said outer terminal zones, at least one circumferentially unextendable, additional, annular insert extending substantially parallel to said annular anchoring insert.

Application of the additional annular insert is conveniently carried out by means of winding at least one elongated element in axially adjacent concentric turns around the toroidal support.

In accordance with a preferred constructional solution, application of the first and/or, where present, the second part of said at least one carcass ply is performed by laying, respectively, at least one first and/or one second series of elongated sections circumferentially distributed on the toroidal support, each of said elongated sections extending in a U-shaped configuration around the cross-sectional profile of the toroidal support, so as to define two lateral portions which are mutually spaced apart in the axial direction and support said terminal zones, and a crown portion extending in a radially external position between the lateral portions.

The sections of the first series may be advantageously laid at a circumferential pitch greater than their width, the sections of the second series each being laid with its crown portion in the space in between the two adjacent sections of the first series, so as to form together wish the latter said at least one carcass ply.

In accordance with a possible constructional variant, application of the stiffening element may be carried out before application of the annular anchoring insert.

It may also be envisaged that the second part of the carcass ply is applied before application of the anchoring insert, the latter being preferably applied so as to radially superimpose an end portion of the respective outer terminal zone.

It is also preferably envisaged that, during application of the second part of said at least one carcass ply, an end portion of each outer terminal zone is arranged against an end portion of the respective inner terminal zone, extending axially away with respect to the equatorial plane.

Preferably, a step is also carried out, consisting in applying at least one circumferentially unextendable, additional, annular insert having a flattened cross-sectional profile and extending radially against an axially inner wall of the main portion of the respective stiffening element.

More particularly, each additional annular insert is applied against one of said inner terminal zones, before application of the respective stiffening element.

Application of each additional annular insert is preferably performed by means of winding of at least one elongated element in radially adjacent concentric turns around the toroidal support.

In accordance with a further possible constructional variant, application of said at least one second part of carcass ply is carried out before application of said at least one stiffening element, so that at least one of said outer terminal zones is located between the respective inner terminal zone and the respective stiffening element.

The method according to the present invention is advantageously carried out substantially without movements directed parallel to the axis of rotation of said toroidal support and aimed at axially folding back towards said equatorial plane a terminal zone of said at least one carcass ply.

The present invention also relates to a tire for vehicle wheels, characterized in that at least one of said annular reinforcing structures comprises: at least one stiffening element applied against said at least one carcass ply and having at least one main portion with a cross-sectional profile tapering away from a rotation axis of the tire; at least one circumferentially unextendable, annular, anchoring insert having a cross-sectional profile with a flattened form, extending axially away with respect to the main portion of the stiffening element.

Preferably, each annular anchoring insert extends in a direction converging towards the geometric axis of rotation of the tire away from an equatorial plane thereof.

Advantageously, the annular anchoring insert and the stiffening element are rigidly connected together, so as to define a substantially one-piece structure formed in the manner of an "L".

The cross-sectional profile of each annular reinforcing structure conveniently has a geometric centre of gravity located in a position such that an axially outer end edge of said annular anchoring insert tends to be moved towards the axis of rotation of the tire following a tension produced along said at least one carcass ply as a result of the inflation pressure of the tire.

In greater detail, the cross-sectional profile of each annular reinforcing structure has a geometric centre of gravity located in a position axially external with respect to said stiffening element and axially internal with respect to an axially outer end edge of said annular anchoring insert.

Preferably, said at least one carcass ply has a first and a second part defining respectively axially inner terminal zones and axially outer terminal zones.

In a preferred constructional solution, said stiffening element is axially located between the respective axially inner terminal zone and the respective axially outer terminal zone of said at least one carcass ply.

Alternatively, the stiffening element may be applied in a position axially outside both the inner end and outer end of the carcass ply.

The annular anchoring insert may be advantageously applied, preferably in a radially external position, against an end portion of said inner terminal zone, extending axially away with respect to an equatorial plane of the tire.

The stiffening element advantageously comprises at least one annular body made of elastomeric material preferably having a hardness greater than 48° Shore D.

Preferably, said annular anchoring insert is arranged substantially in the vicinity of a circumferentially internal edge of the main portion of the stiffening element.

Said stiffening element may have, in a radially internal position, an extended portion extending substantially parallel to said annular anchoring insert.

The presence of at least one additional annular insert extending parallel to said annular anchoring insert is also preferably envisaged.

This additional annular insert may be applied, preferably in a radially external position, against an end portion of said outer terminal zone, extending axially away with respect to an equatorial plane of the tire.

In a preferred constructional solution, said at least one carcass ply comprises a first and/or a second series of elongated sections circumferentially distributed, preferably in an alternate sequence, around said axis of rotation and each extending in a U-shaped configuration around the cross-sectional profile of the carcass structure so as to define two lateral portions mutually spaced in the axial direction, and a crown portion extending in a radially external position between the lateral portions.

Axially inner terminal zones and axially outer terminal zones of said carcass ply are respectively defined on the lateral portions of the sections of the first and the second series.

The annular anchoring insert may be conveniently applied in a radially external position against an end portion of said outer terminal zone, extending axially away with respect to an equatorial plane of the tire.

The end portion of the outer terminal zone may be applied so as to be radially superimposed against an end portion of the inner terminal zone.

It is also possible to envisage at least one circumferentially unextendable, additional, annular insert having a cross-sectional profile extending radially against an axially inner wall of the main portion of said stiffening element.

The invention also relates to a tire wheel characterized in that it comprises a mounting rim provided with bead seats defined by frustoconical surfaces converging towards the axis of rotation of the tire, away from the equatorial plane thereof, and a tire obtained with the method according to the invention and provided with beads designed to fit precisely into the above-mentioned seats.

The above-mentioned rim is characterized by the presence of axially internal bead-unseating safety humps with a minimum or even zero height, preferably in combination with the symmetry of its radially external profile.

This aspect of the invention is based on the recognition of the technical problem associated with passing-over of the above-mentioned hump by the bead depending on the structure of the bead itself.

It has been found that passing-over of the hump by the bead can be controlled more easily when there is a multiple-turn bead core lying in a plane substantially perpendicular to the axis of rotation and/or with turns distributed over a frustoconical surface substantially parallel to the surface of the bead seat.

It has also been found that, as a result of the use of the above-mentioned multiple-turn bead cores, it is possible to reduce significantly the depth of the well located between said bead seats on the mounting rim.

BRIEF DESCRIPTION OF THE DRAWINGS

Further characteristic features and advantages will appear more clearly from the detailed description of a preferred, but not exclusive, embodiment of a method of manufacturing a carcass structure for vehicle wheel tires, a carcass structure which can be obtained by said method, and a wheel comprising a tire provided with said carcass structure and assembled on a corresponding rim, in accordance with the present invention. This description will be provided hereinbelow with reference to the accompanying drawings provided only by way of example and therefore not limiting, in which.

DETAILED DESCRIPTION OF THE EXEMPLARY EMBODIMENTS

Figure 1:
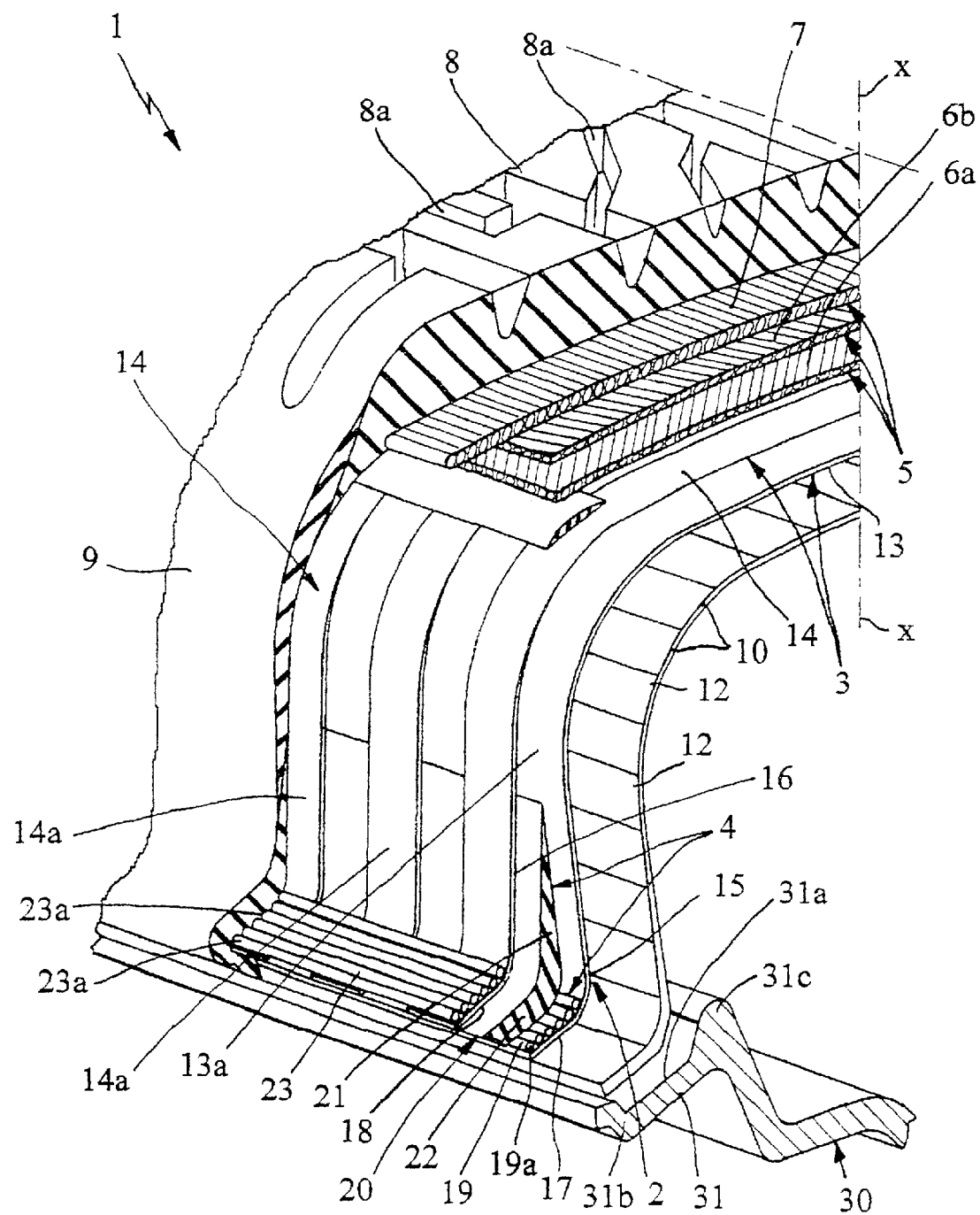
FIG. 1 is a partial cut-away perspective view of a tire manufactured in accordance with the present invention and mounted on a respective rim.

With reference to the figures mentioned, 1 denotes in its entirety a tire for vehicle wheels which can be obtained by means of a method according to the present invention.

The tire 1 has a carcass structure 2 comprising at least one carcass ply 3 formed in a substantially toroidal configuration and engaged, by means of its terminal zones 15, 16, with a pair of annular, axially spaced, reinforcing structures 4 (only one of which is shown in the drawings), each of said structures, when the tire is complete, being located in the area usually identified by the term "bead".

A belt structure 5 comprising one or more belt layers 6a, 6b and 7 is applied onto the carcass structure 2 in a circumferentially external position. A tread band 8 is circumferentially superimposed on the belt structure 5, said tread band having formed in it, following a moulding operation performed at the same time as vulcanization of the tire, longitudinal and transverse recesses 8a which are arranged so as to define a desired "tread pattern".

The tire also comprises a pair of so-called "sidewalls" 9 which are applied laterally on opposite sides onto the carcass structure 2.

The carcass structure 2 may also be lined along its internal walls by a sealing layer 10 or so-called "liner", essentially consisting of a layer of elastomeric material which is airtight and designed to ensure hermetic sealing of the tire itself once inflated.

Figure 2:
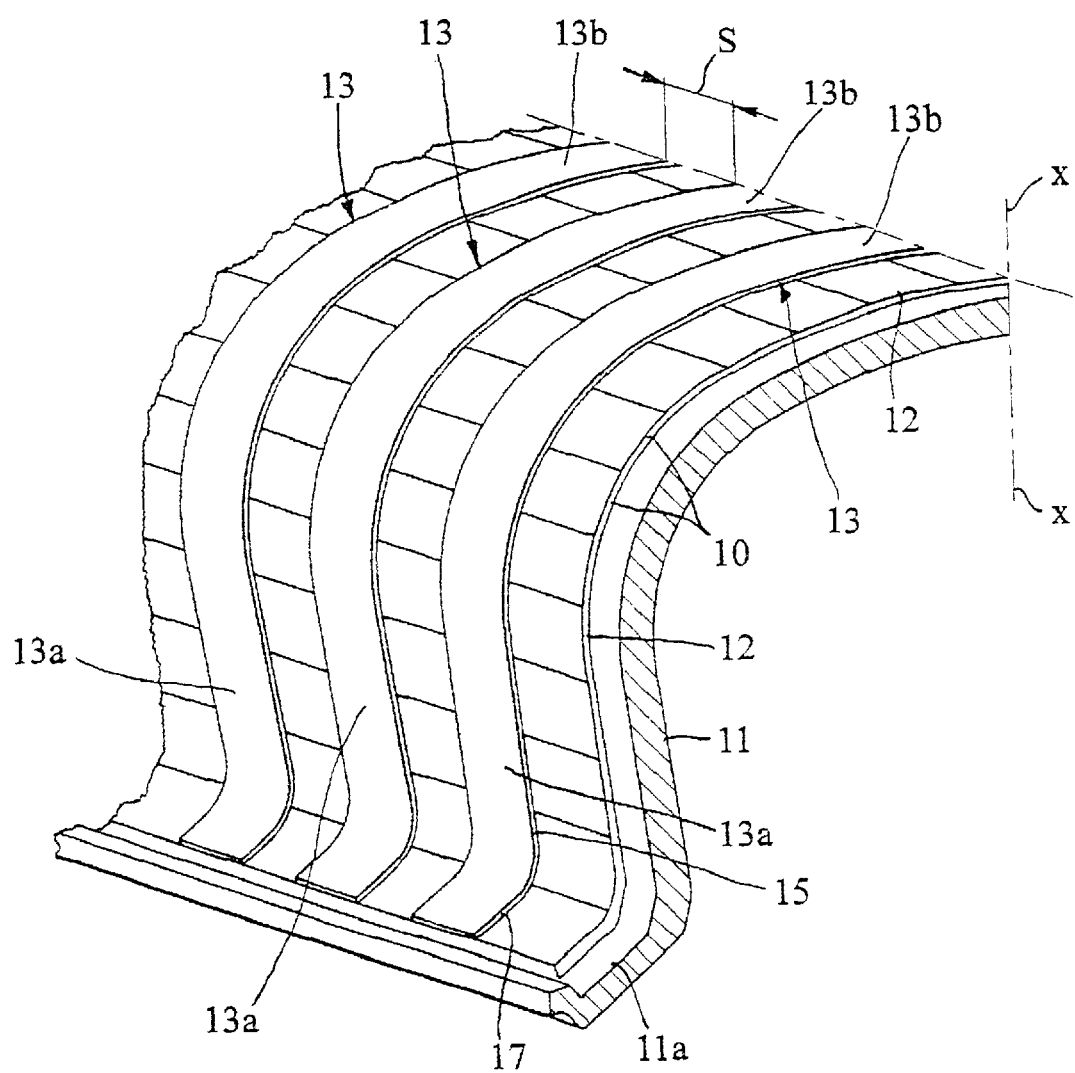
FIG. 2 shows a partial perspective view of an illustration of the laying sequence of a first series of elongated sections for the purpose of forming a carcass ply of the tire according to the invention.
Figure 3:
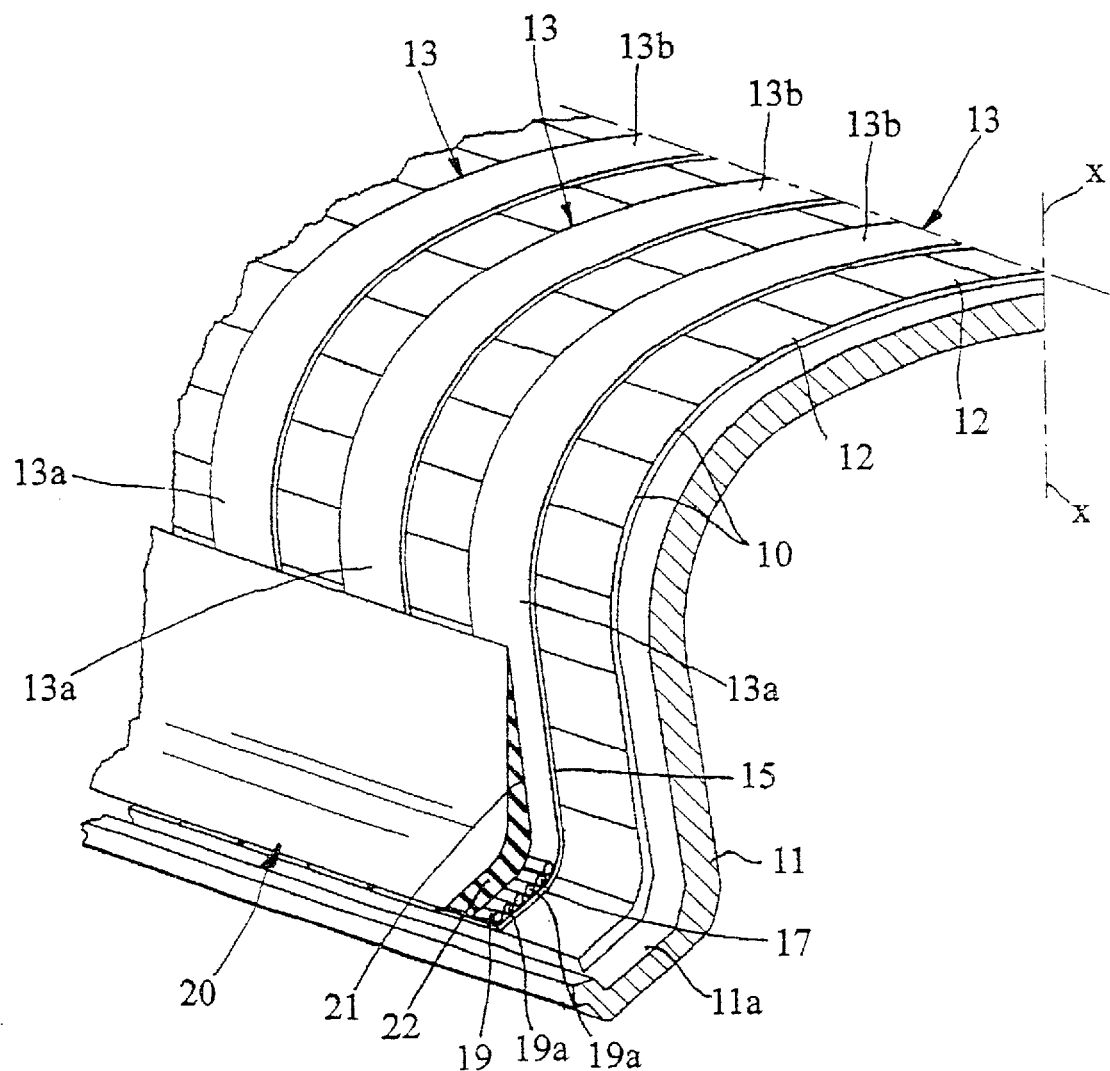
FIG. 3 shows a partial perspective view of an annular anchoring insert and a stiffening element applied in the vicinity of an inner terminal zone of the carcass ply, defined by the elongated sections of the first series.
Figure 4:
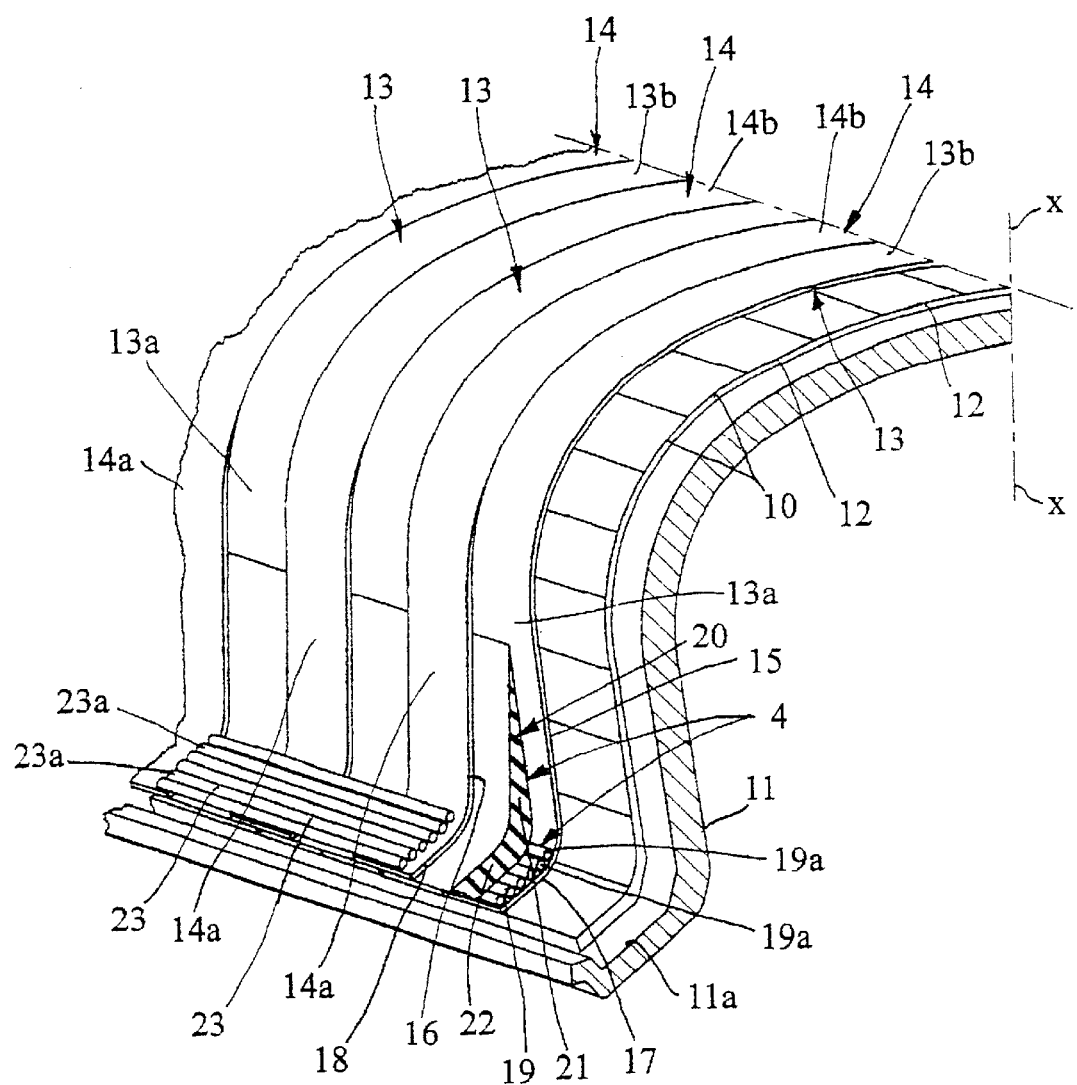
FIG. 4 is a perspective view showing an additional annular insert radially superimposed on an end portion of an axially outer zone of the carcass ply, defined by second elongated sections laid in the spaces between the sections of the first series.

Assembly of the above-mentioned components, as well as the manufacture of one or more of them, is performed with the aid of a toroidal support 11 which can be seen in schematic form in FIGS. 2 to 4 and which is formed in accordance with the configuration of the internal walls of the tire to be formed. In particular, this toroidal support 11 has, in a radially internal position, two axial protrusions defining frustoconical support surfaces 11a converging towards the axis of rotation of the tire away from the equatorial plane X-X thereof, at an angle roughly equal to 15° and preferably ranging between 10° and 20°, even though values outside the specific range are possible.

The toroidal support 11 may have dimensions which are smaller than those of the finished tire, in accordance with a linear measurement preferably of between 2% and 5% taken, for example, along the circumferential extension of the support itself in an equatorial plane X-X thereof which coincides with the equatorial plane of the tire itself.

The toroidal support 11, which is neither described nor illustrated in detail since it is not particularly relevant for the purposes of the invention, may for example consist of a collapsible drum or an inflatable chamber which is suitably reinforced so as to assume and maintain the desired toroidal configuration in the inflated condition.

All this having been stated, manufacture of the tire 1 envisages first of all the formation of the carcass structure 2, which starts with the formation, if appropriate, of the sealing layer 10.

This sealing layer 10 may be advantageously made by means of the circumferential winding, around the toroidal support 11, of at least one ribbon-like band 12 of airtight elastomeric material which is produced by means of an extruder and/or a calender which are arranged in the vicinity of the toroidal support itself. As can be understood from FIG. 1, winding of the ribbon-like band 12 is performed substantially in circumferential turns consecutively arranged alongside each other so as to follow the cross-sectional profile of the external surface of the toroidal support 11.

For the purposes of the present description, cross-sectional profile is understood as being the configuration represented by the semi-section of the toroidal support 11 sectioned along a plane radial to a geometric axis of rotation thereof—not shown in the drawings—coinciding with the geometric axis of rotation of the tire and hence of the carcass structure 2 being formed.

In accordance with the present invention, the carcass ply 3 is formed directly on the toroidal support 11 by laying, as will be clarified more fully below, a first and a second series of elongated sections 13, 14 obtained from at least one continuous elongated element having preferably a width of between 3 mm and 15 mm. This elongated element basically comprises one or more filament-like elements, preferably 3 to 10 filament-like elements which are arranged alongside each other in a longitudinal and parallel manner and are at least partially incorporated in a layer of elastomeric material.

These filament-like elements may, for example, each consist of a textile cord having preferably a diameter of between 0.6 mm and 1.2 mm or a metal cord having preferably a diameter of between 0.3 mm and 2.1 mm. The continuous elongated element, which is supplied, for example, directly from an extruder intended for the manufacture thereof, may advantageously be guided on a laying apparatus, the structural and functional characteristics of which are described in more detail in European patent application No. 97830731.2 (EP 0928680) in the name of the same Applicant, the contents of which are considered hereinbelow.

This laying apparatus is suitable for cutting sequentially the continuous elongated element so as to form the elongated sections 13, 14 of predetermined length.

The cutting of each elongated section 13, 14 is immediately followed by the laying thereof onto the toroidal support 11 forming, for example with the aid of movable gripping elements and/or suitable rolling members, the elongated section in a U-shaped configuration around the cross-sectional profile of the toroidal support itself. Once laying has been performed, each elongated section 13, 14 essentially comprises two lateral portions 13a, 14a extending radially towards the axis of the toroidal support 11, in positions axially spaced from one another, and a crown portion 13b, 14b extending in a radially external position between the lateral portions themselves. It must be pointed out that each lateral portion 13a, 14a follows exactly the surface of the toroidal support 11 as far as a point close to the axially outer edges of the respective frustoconical support surface 11a.

The toroidal support 11 may be angularly rotated so as to perform a step-by-step movement in synchronism with operation of the above-mentioned laying apparatus, so that each action involving cutting of each elongated section 13, 14 is followed by laying thereof in a position circumferentially spaced with respect to the previously laid down section 13, 14.

More particularly, the rotation of the toroidal drum 11 occurs preferably with an angular pitch corresponding to a circumferential displacement equal to a multiple of the width of each elongated section 13, 14, more precisely twice said width.

It must be pointed out for the purposes of the present description, where not otherwise indicated, that the term "circumferential" refers to a circumference lying in the equatorial plane X-X and in the vicinity of the external surface of the toroidal support 11.

According to a preferred embodiment of the present invention, the operating sequence described above is such that a first complete revolution of the toroidal support 11 about its axis results in the formation of a first part of the carcass ply 3 following the laying of the first series of elongated sections 13 circumferentially distributed with a circumferential spacing equal to twice the width of each of the said sections.

This first part of the carcass ply 3 comprises, in radially internal areas of the lateral portions 13a, axially inner terminal zones 15 which are mutually spaced (only one being visible in the drawings) and each of which is extended by an end portion 17 which is folded axially back outwards, i.e. away from the equatorial plane X-X, preferably in a direction parallel to the frustoconical support surface 11a.

As can be clearly seen from FIG. 2, an empty space S is preferably left between two sections of the first series, said space, at least in the crown portion 13b of the sections themselves, having a width equal to that of the said sections.

For the purposes of the present invention, however, it is also possible for the movement of the toroidal support 11 to be performed with a circumferential interval equal to the width of each of the sections themselves, so that the sections of the first series are laid with the respective crown portions 13b in a mutually adjacent relationship so as to result in the formation of a first complete carcass ply.

Preferably the laying of each elongated section 13 of the first series is performed in a plane parallel to the axis of rotation of the toroidal support 11. However, it is possible to envisage, if necessary, that laying of the elongated sections 13 may be performed with an orientation inclined relative to the direction of circumferential extension of the toroidal support 11, for example at an angle of between 15 and 35 degrees.

Adjustment of the angle of laying of the elongated sections 13, 14 may be obtained, for example, by suitably orienting the geometric axis of rotation of the toroidal support 11 with respect to the above-mentioned laying apparatus.

The formation of a carcass structure 2 then proceeds with the step of applying the above-mentioned unextendable annular structures 4, or at least some of them, in the vicinity of each of the inner terminal zones 15 of the carcass ply 3 being formed, so as to obtain the carcass areas, known as "beads" which are specially designed to ensure fixing of the tire onto a corresponding mounting rim.

In accordance with the present invention, one, or preferably, both the annular reinforcing structures 4 are advantageously formed in accordance with the description given in co-pending European patent application No. 98110354.2 in the name of the same Applicant.

More particularly, in the constructional solution according to FIGS. 1 to 7, the formation of each annular structure 4 envisages firstly the step of forming, radially superimposed with respect to the end portion 17 of each inner terminal zone is, at least one circumferentially unextendable annular anchoring insert 19 having a cross-sectional profile with a flattened form and extending substantially axially away from the equatorial plane X-X.

More particularly, it is preferably envisaged that the cross-sectional profile of the annular anchoring insert 19 extends in a direction converging towards the geometric axis of the toroidal support away from the equatorial plane X-X, at an angle preferably equal to 15° and in any case corresponding to the inclination present on the corresponding frustoconical support surface 11a.

More particularly, in accordance with a preferred constructional solution, the annular anchoring insert 19 is formed directly against the inner terminal zone 15 of the carcass ply part 3 defined by the elongated sections 13 of the first series, by means of winding of at least one continuous filament-like element in axially adjacent concentric turns 19a around the toroidal support 11.

The turns 19a forming the annular anchoring insert 19 may be arranged in one or more radially superimposed layers, with the aid, if necessary, of rollers or other suitable means acting against the surface of the toroidal support 11.

The sticky consistency of the elastomeric layer which lines the elongated sections 13 of the first series, and, if present, the sealing layer 10 laid beforehand on the drum itself, ensure the stable positioning of the individual turns 19a during forming.

The laying of the filament-like element may be advantageously preceded by a rubberization step during which the filament-like element itself, which is preferably made of metallic material, is lined with at least one layer of raw elastomeric material which, in addition to ensuring an excellent rubber-metal bond on the filament-like element itself, facilitates adhesion thereof for the purposes of stable positioning on the carcass structure being formed.

At least one stiffening element 20 is then formed against each inner terminal zone 15 of the first portion of the carcass ply 3, said stiffening element having a main portion 21 with a substantially triangular cross-sectional profile tapering away from the axis of rotation of the tire and arranged substantially in an axially internal position with respect to the annular anchoring insert 19.

The stiffening insert 20, comprising preferably an annular body made of elastomeric material with a hardness greater than 48° Shore D and preferably ranging between 48° and 55° Shore D, may be advantageously formed directly against the inner terminal zone 15, for example by applying a continuous strip of elastomeric material emerging from an extruder located adjacent to the toroidal support 11.

Said continuous strip may have the definitive cross-sectional form of the stiffening element 20 already when it emerges from the extruder. Alternatively, the continuous strip will have a cross-section which is smaller than that of the stiffening element 20, and the latter will be obtained by applying the strip itself in several adjacent and/or superimposed turns, so as to define the final configuration of the stiffening element 20.

In the constructional solution according to FIGS. 1 to 7, moreover, it is envisaged that the stiffening element 20 should have, in a radially internal position, an extended portion 22 forming a continuation of the main portion 21, in a direction substantially parallel and radially superimposed with respect to the annular anchoring insert 19.

In accordance with a preferred constructional solution of the invention, after application of the stiffening element 20, the formation of the first carcass ply 3 is terminated by means of the laying of the second series of elongated sections 14 obtained by cutting to size the above-mentioned continuous elongated element and applied onto the toroidal support 11 in a manner similar to that described for the elongated sections 13 of the first series.

As can be clearly seen from FIG. 4, each section 14 of the second series is laid in a U-shaped configuration around the cross-sectional profile of the toroidal support 11, between two consecutive sections 13 of the first series and in a direction parallel to the latter. More particularly, each section 14 of the second series has its respective crown portion 14b circumferentially arranged in between the crown portions 13b of the sections 13 of the first series, so as to fill the space S existing between them, and a pair of axially spaced lateral portions 14a.

Overall, the elongated sections 14 of the second series define a second part of the carcass ply 3, having axially outer terminal zones 16, each of which is located in an axially external position with respect to the respective inner terminal zone 15. More particularly, in the examples according to FIGS. 7 to 8, each outer terminal zone 16 is superimposed in an axially external position on the main portion 21 of the respective stiffening element 20 and is extended by an end portion 18 extending axially away with respect to the equatorial plane X-X, being radially superimposed on the extended portion 22 of the stiffening element itself.

Consequently, each stiffening element 20 is axially located between the axially inner terminal zone 15 and the axially outer terminal zone 16 of the carcass ply 3.

It may also be envisaged that the lateral portions 14a of each section 14 of the second series partially cover the lateral portions 13a of two consecutive sections 13 of the first series, each along a section comprised between the radially outer edge of the respective stiffening element 20 and the transition zone between the lateral portion itself and the crown portion 13b, 14b.

Owing to the mutual convergence between the adjacent lateral portions 13a, 14a oriented radially with respect to the geometric axis of the toroidal support 11, the overlapping or covering of the lateral portions 13a of the sections 13 of the first series, namely the circumferential width of the overlapping zones, progressively decreases from a maximum value in the vicinity of the radially outer edge of the stiffening element 20 of each annular reinforcing structure 4 to a zero value in the transition zone between the lateral portions 13a, 14a and the crown portions 13b, 14b.

In accordance with a possible variant embodiment, which may be adopted in particular in the case where the sections 13 of the first series are laid so as to form a first complete carcass ply, any sections 14 of the second series may also be laid at a circumferential interval equal to their width, so as to be adjacent to one another and define together a second carcass ply superimposed on the first carcass ply. In this case, the sections 14 of the second series may be obliquely oriented with respect to the direction of circumferential extension of the tire, preferably in the opposite direction with respect to any inclination of the sections 13 of the first series.

In accordance with the constructional solution according to FIGS. 1 to 7, after the elongated sections 14 of the second series have been laid, the forming of the annular bead reinforcing structures 4 is completed.

For this purpose, as can be seen from FIG. 4, for each of the annular reinforcing structures 4, a circumferentially unextendable, additional, annular insert 23, with a flattened cross-sectional profile substantially parallel to the annular anchoring insert 19, is applied. Preferably this additional annular insert 23 is directly formed in a radially external position against the end portion 18 of the outer terminal zone 16, by means of winding of a respective filament-like element in axially adjacent concentric turns 23a around the toroidal support 11.

Following this operation, the end portion 18 of each outer terminal zone 16 remains advantageously enclosed between the extended portion 22 of the stiffening element 20 and the additional annular insert 23.

In tires of the radial type, a belt structure 5 is usually applied to the carcass structure 2.

This belt structure 5 may be formed in any manner convenient for the person skilled in the art and, in the example illustrated, comprises essentially a first and a second belt layer 6a, 6b having cords with a respectively intersecting orientation. An additional belt layer 7, is superimposed on said belt layers for example obtained by winding at least one continuous cord in axially adjacent turns onto the first and second belt layers 6a, 6b The tread band 8 and the side walls 9, which may also be obtained in any manner convenient for the person skilled in the art, are then applied onto the carcass structure 2. Constructional examples of a belt structure, of sidewalls and of a tread band which may be advantageously used for the complete formation of the tire 1 on the toroidal support 11 are described in European patent No. 97830632.2 in the name of the same Applicant.

The tire 1 thus prepared is now ready to undergo—after removal, where appropriate, from the support 11—a vulcanization step which may be carried out in any convenient manner.

Figure 8:
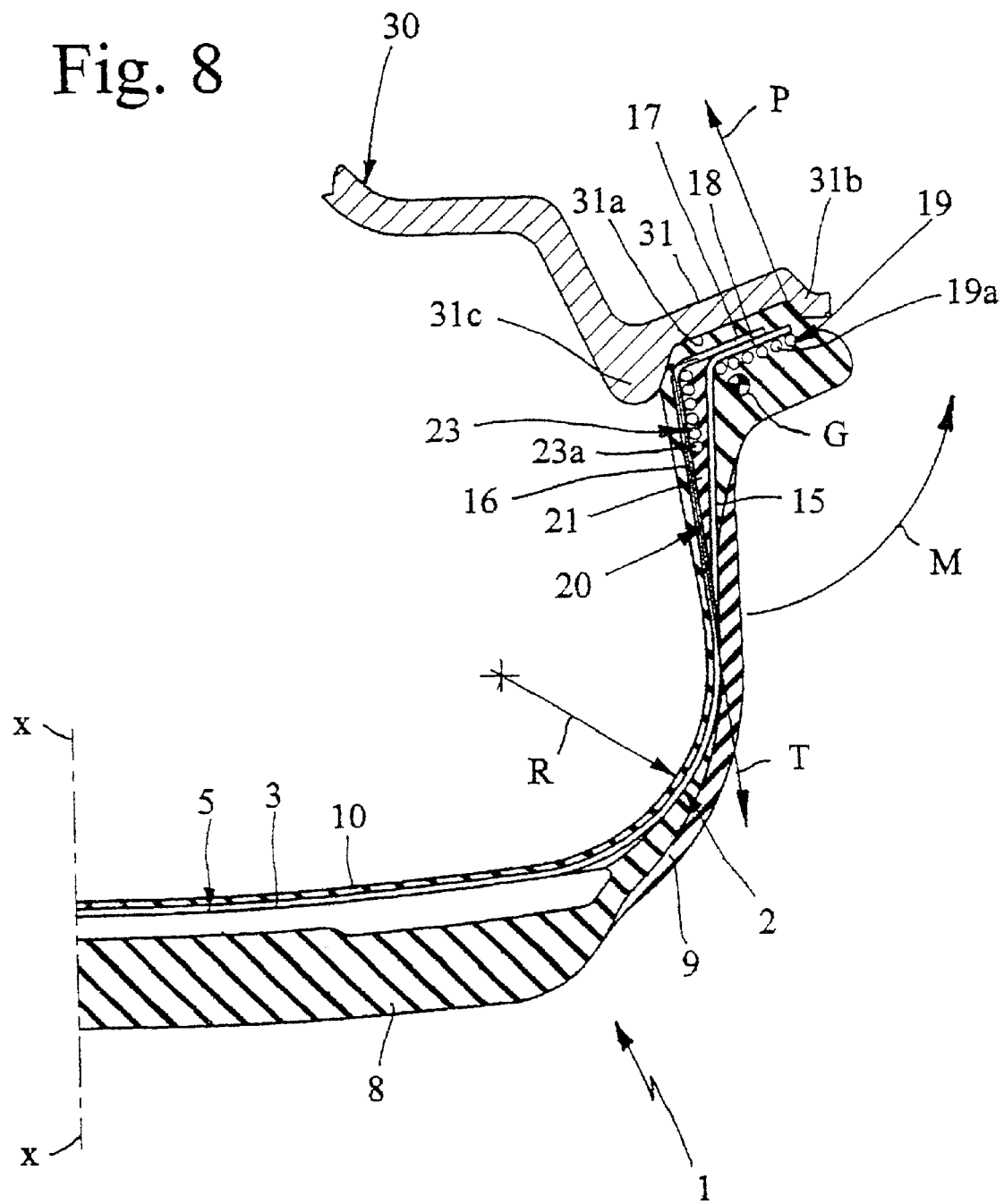
FIG. 8 shows a partial cross-sectional view of a tire in accordance with a constructional variant of the invention, mounted in the inflated condition on a respective rim.

The constructional variant illustrated in FIG. 8 differs from that described above in the way in which the annular reinforcing structures 4 are formed. It is in fact envisaged that the additional annular insert 23 of each annular reinforcing structure 4, where present, is substantially oriented radially with respect to the axis of the tire and applied against an axially internal wall of the main portion 21 of the respective stiffening element 20.

More particularly, it is preferably envisaged that each additional annular insert 23 is directly formed against the respective inner terminal zone 15, prior to application of the stiffening element 20, by winding the respective filament-like element so as to form the mutually adjacent concentric turns 23a in a radially superimposed relationship around the toroidal support 11.

It must be pointed out that such an additional annular insert may also be used in the constructional solution described with reference to FIGS. 1 to 7, in addition to or by way of replacement of the additional annular insert 23 illustrated in these figures.

After formation of the additional annular insert 23, the stiffening element is formed in a manner similar to that described with reference to the constructional solution according to FIGS. 1 to 7.

Preferably, in the variant embodiment according to FIG. 8, the stiffening element 20 does not have the extended portion 22. In this case, during subsequent laying of the elongated sections 14 of the second series, the end portions 18 of the outer terminal zones 16 are each arranged against the end portion 17 of the respective inner terminal zone 15, in a radially superimposed relationship against the latter.

The formation of each annular reinforcing structure 4 is completed with the application of the annular anchoring insert 19, which is formed radially superimposed on the end portion 18 of the respective outer terminal zone 16, by means of winding of the respective filament-like element so as to form axially adjacent concentric turns 19a. In contrast to that stated above, in the embodiment variant according to FIG. 9 it is envisaged that the stiffening element 20 is located in an axially external position with respect to the whole carcass ply 3. For this purpose, the application, where necessary, of the strip-shaped sections 14 of the second series for formation of the second part of the carcass ply 3 is performed prior to application of the stiffening element 20 as well as any additional annular insert 23. In this way each outer terminal zone 16 is located in between the respective inner terminal zone 15 and the stiffening element 20 itself.

Figure 9:
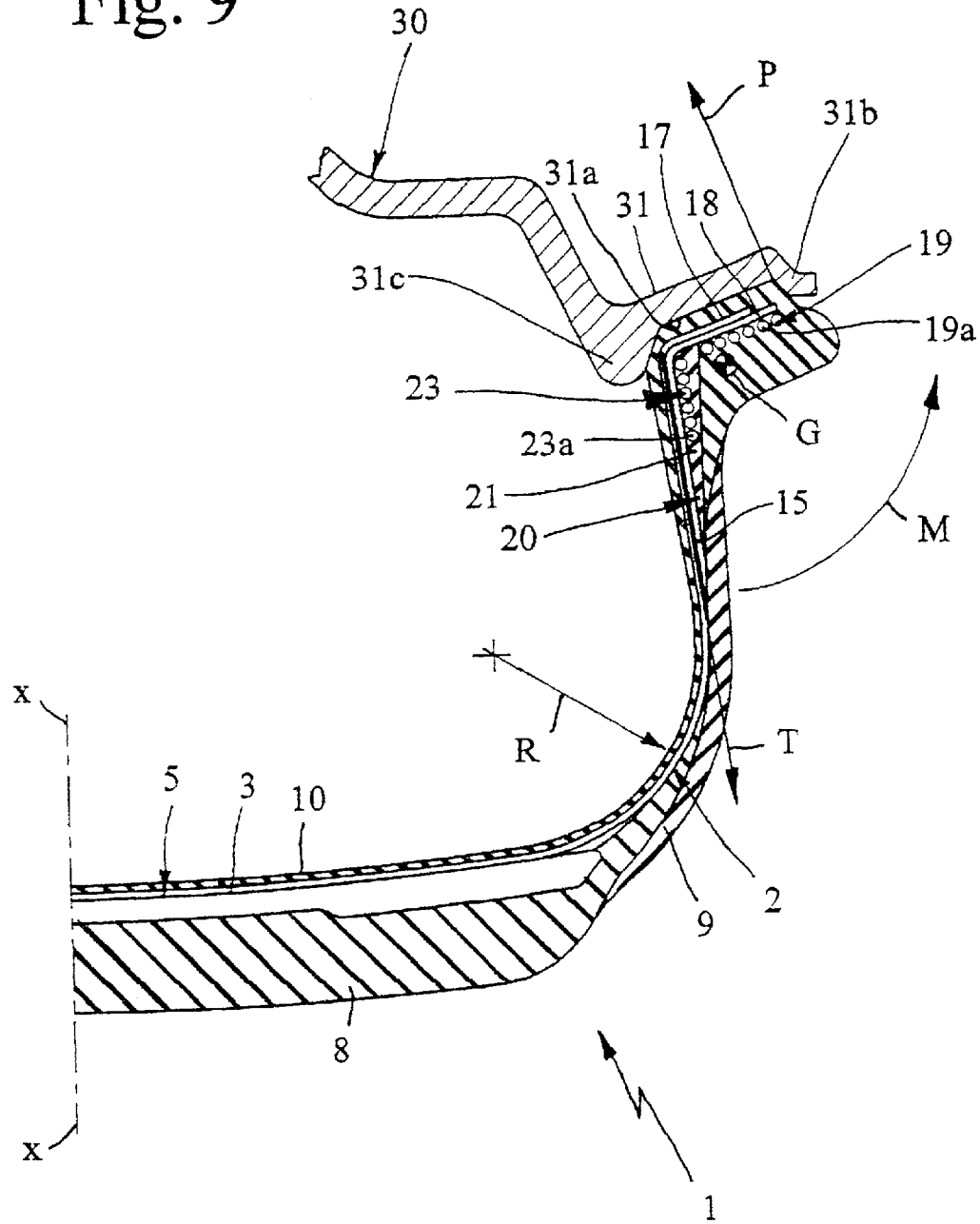
FIG. 9 shows a partial cross-sectional view of a tire in accordance with a further constructional variant of the invention, mounted in the inflated condition on a respective rim.

As regards the remaining structural and constructional aspects of the constructional solution according to FIG. 9, reference should be made to the description already given in connection with FIG. 8.

In each of the constructional solutions described, the mutual interaction between the annular anchoring insert 19, the stiffening element 20 and the remaining components of the carcass structure 2 is such that the stiffening element and the annular anchoring insert are substantially connected rigidly to one another.

In other words, the annular anchoring insert 19 and the stiffening element 20 act, from a functional point of view, in the manner of a one-piece structure which is substantially L-shaped and has a radial arm consisting of the main portion 21 of the stiffening element 20, and an axial arm consisting of the annular anchoring insert 19 extending axially away with respect to the equatorial plane X-X of the tire.

FIGS. 5 to 9 illustrate in schematic form the functional behaviour of the tire 1. In these figures the tire 1 is shown mounted on a respective rim 30 provided, in axially opposite positions, with two seats 31 for engagement of the beads. Each engaging seat 31 has a so-called bead seat 31a defined by a frustoconical surface converging towards the axis of the tire away from the equatorial plane X-X, parallel to the extension of the respective anchoring insert 19. The seat 31a is axially delimited between an axially external circumferential hump 31b and an axially internal circumferential hump 31c, referred to below also as a "bead unseating safety hump".

As indicated in the above-mentioned figures, the cross-sectional profile of the annular reinforcing structure 4 has its geometric centre of gravity G located in an axially external position with respect to the stiffening element 20 and an axially internal position with respect to the axially external terminal edge of the annular anchoring insert 19.

The inflation pressure of the tire produces a tensioning effect on the carcass ply along the filament-like elements incorporated in the sections of the first and second series.

Figure 5:
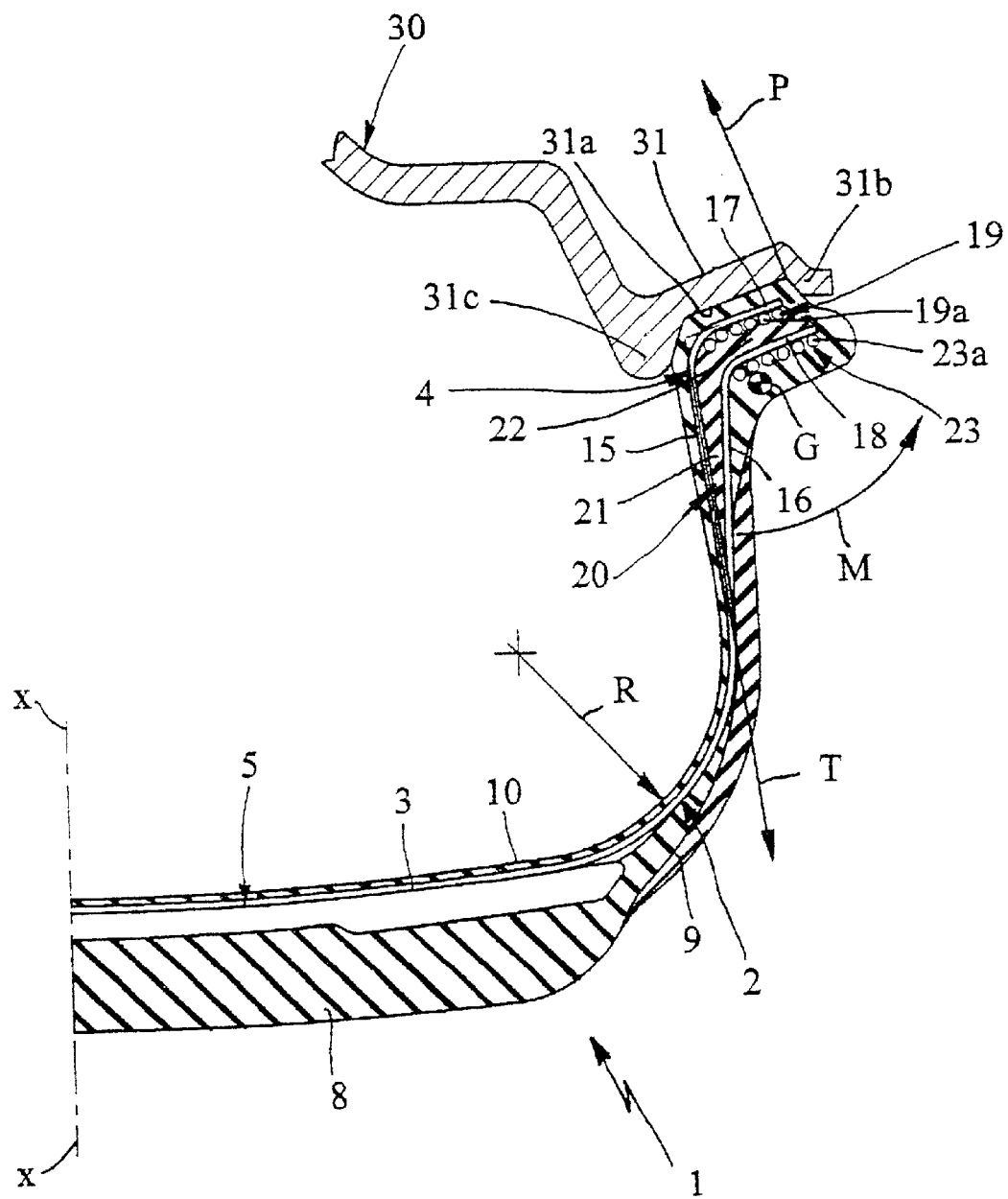
FIG. 5 shows a partial cross-sectional view of a tire according to the invention mounted in an inflated condition on a respective rim.

In FIG. 5, relating to the tire in the inflated condition, the tensioning effect of the sections 13 of the first series is produced by the force T applied in the vicinity of the radially internal edge of the stiffening element 20. The force T, which is tangential to the longitudinal extension of the respective section 13 in the application point indicated above, has a value proportional to the value of the inflation pressure and to the value of the radius of curvature R presented by the cross-sectional profile of the carcass ply 3 in the vicinity of the side wall of the tire 9 and produces around the centre of gravity G a moment M as a result of which the anchoring insert 19 is pushed in the vicinity of its axially external edge against the seat 31a of the respective rim 30. A perfect hermetic seal of the air contained inside the tire is thus ensured as a result of the thrust P exerted by the bead against the seat 31a of the rim 30.

Figure 6:
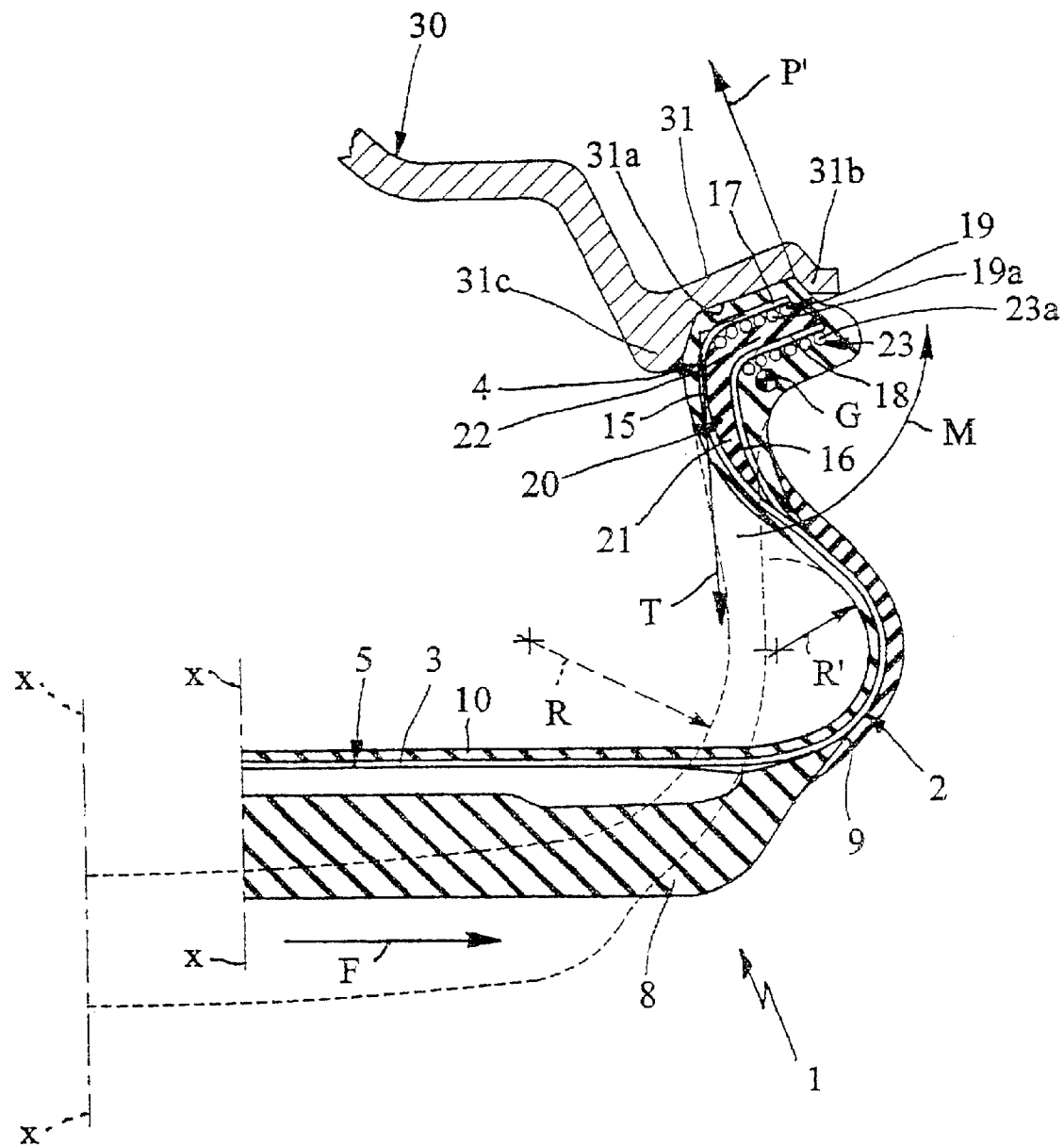
FIG. 6 shows a tire according to FIG. 5 in the travel condition under a lateral thrust load.

FIG. 6 shows the tire in travel conditions under load and subject to lateral thrust. More particularly, FIG. 6 illustrates the behaviour of the tire in the region of the bead located on the inner side of a bend negotiated by the vehicle.

As can be noted, as a result of the lateral thrust effect F, the carcass structure undergoes compression and lateral displacement with respect to the equatorial plane X-X, towards the inside of the bend.

Consequently, the radius of curvature of the carcass ply 3 in the vicinity of the side wall is reduced to a value R' less than the radius R which can be measured in the conditions according to FIG. 5. At the same time, the bead 4 of the tire, particularly in the vicinity of the main portion 21 of the stiffening element 20, undergoes flexing which tends to increase tensioning of the axially inner zone 15 of the carcass ply 3, which has the effect of producing a further increase in the moment M and consequent thrust P' exerted by the axially outer zone of the bead against the seat 31a.

Figure 7:
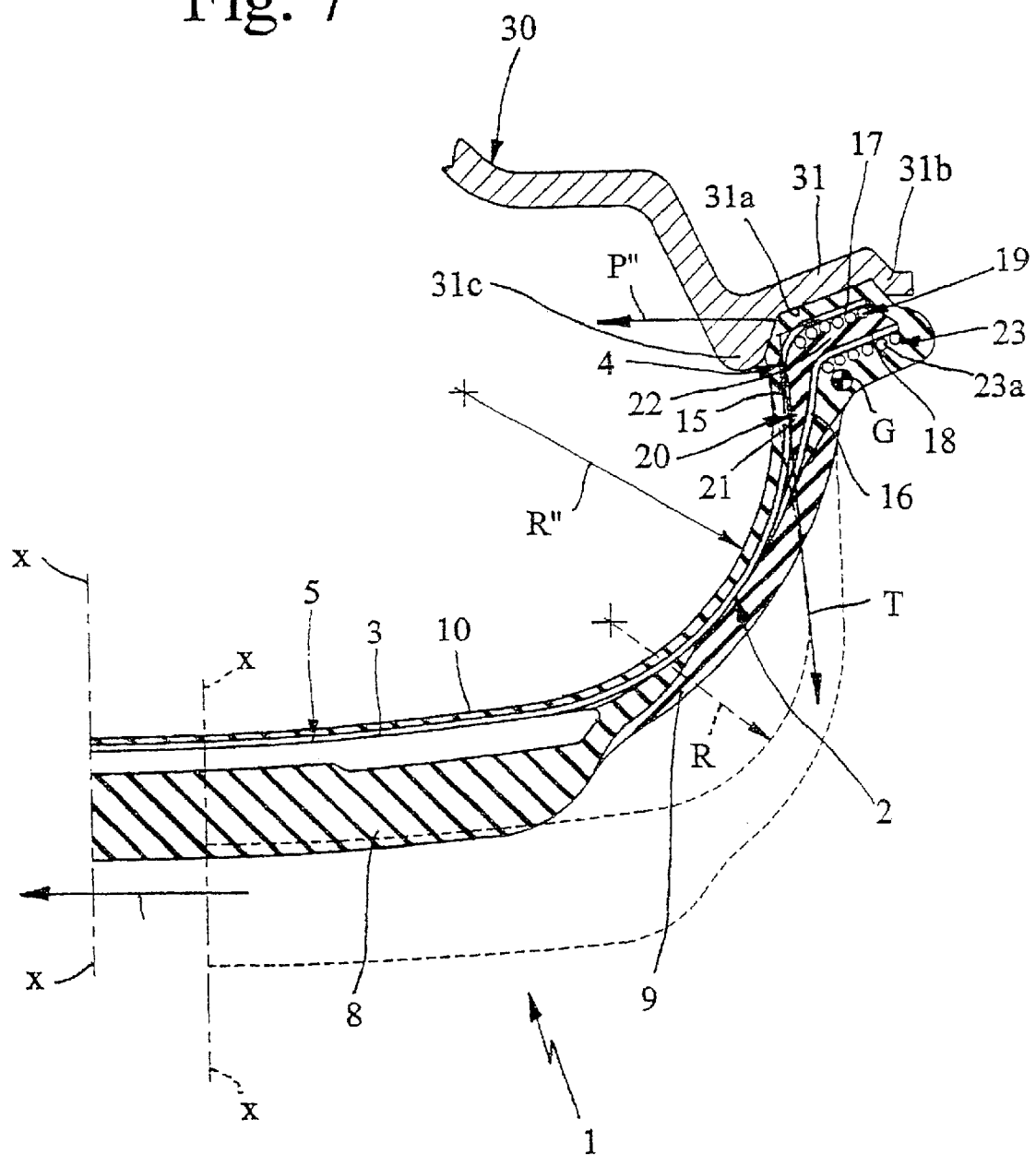
FIG. 7 shows the tire according to FIG. 5 in the travel condition under load and subject to lateral thrusts directed in the opposite direction to those of FIG. 6.

FIG. 7 shows the tire in travel conditions under lateral thrust load, with regard to the bead arranged on the outer side of a bend negotiated by the vehicle. In this situation, the compression and lateral displacement effect induced on the carcass structure 3 causes the latter to assume, in the region of the sidewall 9, a curved extension having a radius R" which is wider than the radius R which can be found in the condition described in FIG. 5.

Tensioning of the carcass ply 3 is consequently increased in both the inner terminal zone 15 and outer terminal zone 16, and the main portion 21 of the stiffening element 20 tends to flex towards the equatorial plane X-X. In this situation the bead of the tire tends to exert an axial thrust P'" directed towards the external circumferential hump 31c, increasing the contact pressure on the seat 31b owing to the conicity of the latter and the annular anchoring insert 19.

Figure 10:
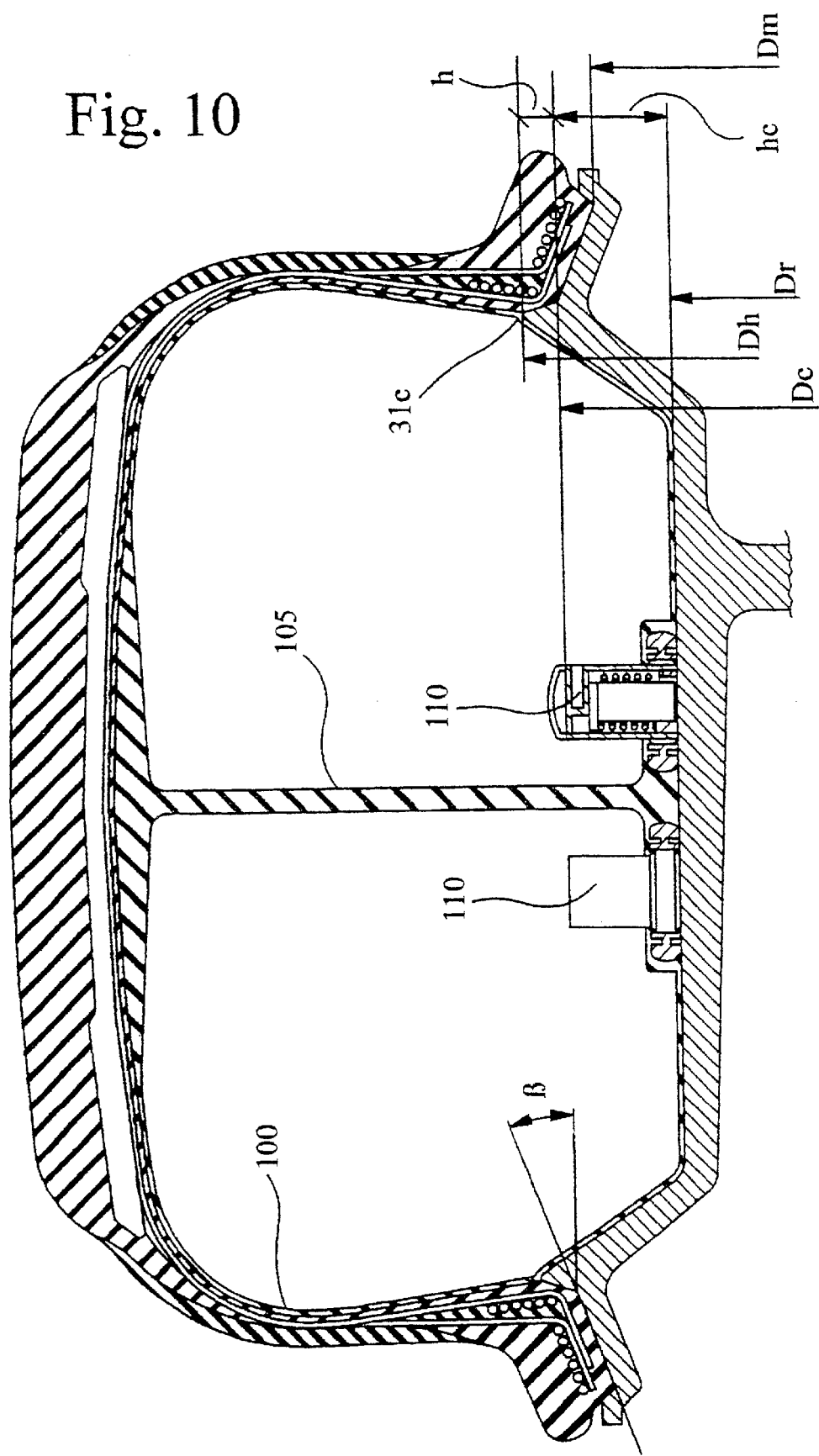
FIG. 10 shows a transversely complete, partially cross-sectioned view of the tire in accordance with the constructional variant according to FIG. 8, internally provided with an inner tube and mounted in the inflated condition on a respective rim.

FIG. 10 shows a partially cross-sectioned view of the tire according to the invention mounted on a rim provided with bead seats defined by frustoconical surfaces converging towards the axis of rotation of the tire, away from the equatorial plane thereof, at an angle β preferably ranging between 5° and 25°, and even more preferably equal to 20°.

The bead of the tire incorporates a circumferentially unextendable annular reinforcing structure chosen from among those described above, in particular that described with reference to FIG. 8.

The rim has a preferably symmetrical radially external profile which comprises a wide central well axially delimited by said bead seats having a minimum diameter $D_m$ greater than the minimum diameter $D_r$ of said well.

In the region of each bead seat, the rim has a hump 31c in an axially internal position designed to prevent the corresponding bead of the tire during travel from passing over it and thus dropping inside the central well.

Known tires, which are mounted on rims with bead seats formed as described—for example, the tire according to patent U.S. Pat. No. 5,634,993 already mentioned—are provided with beads reinforced with the usual bead cores according to the state of the art, consisting of a single metal core, referred to hereinbelow as a "one-piece bead wire" to distinguish it from the "multiple-turn" bead wires of the bead reinforcing structure according to the invention.

It was realized that, with these tires, the above-mentioned hump must have a considerable radial extension so as to prevent, in the case of deflation of the tire, the bead from passing over the hump and having well-known serious consequences on the road-holding performance of the vehicle. In other words, the diameter of the hump must be at least substantially equal to the maximum diameter of the one-piece bead wire. For this reason known rims have a central well which is greatly depressed with respect to the diameter of the bead seat measured in a position adjacent to the hump: in this way, in fact, during fitting of the tire onto the rim, the bead of the tire may be arranged in a very eccentric position with respect to the rim so as to be able to pass over the hump, axially from the inside towards the outside, in successive stages, firstly along a circumferential centre line of the hump and then along the diametrically opposite circumferential centre line.

With tires of the type illustrated in the U.S. patent cited above, the problem is particularly serious owing to the fact that the radially more internal diameter of the tire bead, equal to $D_m$, is much smaller than the maximum diameter $D_c$ of the bead seat, i.e. the tire fitting diameter. Consequently the depth of the above-mentioned well must be made much larger and this creates problems with regard to mounting the wheel onto the hub of the vehicle.

The said patent solves the problem by using a rim with varied fitting, i.e. by increasing the diameter of the bead seat on the vehicle side so as to be able to increase the minimum diameter of the well in the axially adjacent portion. This measure is able to solve the problem of mounting the wheel on the vehicle, but gives rise to a series of problems in connection with the road-handling performance of the tire, due to the fact that the corresponding tire is a tire with an asymmetrical structure, i.e. having beads with different fitting diameters, and therefore reacts in a non-uniform manner to the stresses affecting it.

The tire according to the invention solves this problem too in an effective manner.

It must first of all be noted that the pair of bead cores each consisting of a winding of several turns of metal cord forms a bead reinforcing structure which is much more flexible than the known one-piece bead wire and is capable therefore, when the tire is deflated, of being deformed more easily so as to assume the particular elliptical (oval) configuration necessary for allowing the bead to pass over the axially internal hump of the rim during the operation of mounting the tire onto the rim and, conversely, removal thereof from the rim.

It must be noted, moreover, that these windings, which may also be used separately from one another—i.e.

individually—in the specific embodiment shown, are used in combination with one another, and more specifically one being arranged in a plane substantially perpendicular to the axis of rotation of the tire, and the other being arranged along a frustoconical surface substantially parallel to the bead seat; consequently, this structure behaves substantially in the manner of a rigid L-shaped reinforcement, as described above.

Therefore, when the tire is mounted on the rim, this reinforcement is much more resistant to the forces which are directed axially towards the inside and which, in the case of beads with a one-piece bead core, are able to cause the bead to slip over the hump.

In these known tires, in fact, when the bead core has managed to pass over the hump, no other structural element of the bead is able to prevent bead unseating. Whereas, in the tire according to the invention, in each of the windings referred to above, the increase in the diameter needed for bead unseating to occur would result in a progressively greater increase in the diameter of the turns of said windings, and, in particular in the radial winding, an increasing elongation from the radially innermost turn to the turn in the radially outermost position. Such elongation is effectively prevented by the mechanical strength characteristics of the cord used.

Also, in the case of a conical winding, bead unseating would require a gradual increase in the diameter of the cord turns, i.e. an increasing elongation of the winding turns, from the turn in the axially innermost position to the turn in the axially outermost position. Such increases are effectively prevented by the substantial unextendable nature of the cord used.

By way of conclusion, the hump could also not be present, the bead seat per se forming a hump which is sufficient to prevent bead unseating and, in any case, the height of the hump may be kept to within very small values and also the depth of the channel may have a small value.

It will now be obvious that the problem may also be resolved using a single winding of metal turns, preferably arranged along a frustoconical surface parallel to the surface of the bead seat.

In particular, it is preferable to keep the diameter $D_h$ of the hump 31c so that it has a value which is not less than the radially external diameter of the axially innermost cord turn of the conical winding. In combination, or by way of an alternative, it is preferable to keep the diameter $D_h$ of the hump 31c at a value which is not greater than the radially external diameter of the radially innermost cord turn of the radial winding.

With reference to FIG. 10 which shows a tire of size 215/630/420, the fitting diameter $D_c$ is equal to 424.2 mm, the height h of the hump is equal to 3.5 mm, and in any case is not greater than 4 mm and is preferably between 3 and 4 mm, and the depth $h_c$ of the central well is 17.5 mm, preferably between 15 and 25 mm.

In a preferred embodiment of the invention, illustrated in FIG. 10, the wheel formed by the assembly of the tire and rim described above also comprises a device which is designed to provide the wheel with a self-supporting capacity also in partially deflated conditions. Preferably, the above-mentioned device consists of an inner tube 100, with separate cavities, even more preferably the inner tube described in the already mentioned patent application EP 98.110354.2 (EP 0922592) in the name of the same Applicant.

The above-mentioned inner tube, which is elastically expandable by means of the introduction of pressurized fluid into its internal volume, has an elliptical shape so as to adapt itself in particular to low-profile tires and comprises two separate and independent volumes which can be inflated separately from one another and are separated by a central longitudinal wall 105 having a high rigidity and extending in a plane perpendicular to the axis of rotation of the wheel.

Inflation of the above-mentioned chambers is preferably controlled by means of the valves without a fixed connection to the mounting rim, which are described in the preceding patent application No. EP 98.830074.4 (EP0937590) in the name of the same Applicants. Preferably, each of these valves 110 performs, separately from each other, the three functions of inflation, rapid deflation and calibration of the correct value for the inflation pressure.

The present invention achieves important advantages.

In particular, as a result of the constructional design of the annular reinforcing structures 4 according to the invention, it is possible to obtain a tire which is suitable for mounting on a rim provided with bead seats having a conicity directed towards the outside, without resulting in any substantial complication in the tire manufacturing process.

As a result of the invention, in fact, it is possible to make use of the tension produced on the carcass ply or plies so as to obtain an increase in the contact pressure of the bead on the seat of the rim in any operating condition, without requiring for this purpose the provision of complex annular reinforcing structures envisaged by the known art.

In particular, as a result of the simplified annular reinforcing structures according to the invention, it is possible to assemble components of the whole tire on a rigid drum having the internal shape of the tire itself, in a completely automatic manner.

In fact, in accordance with the above description, the tire is preferably manufactured by applying onto a collapsible rigid annular support the constituent elements of the tire, and in particular of the bead reinforcing structures, with movements directed substantially perpendicularly with respect to the axis of rotation of the support itself and/or tangentially with respect to its circumferential extension. More particularly, the invention offers the possibility of supplying the components substantially without movements directed parallel to said axis of rotation, or in any case such as to cause axial folding back, towards the inside, of terminal zones of the carcass ply or plies.

More specifically, as a result of the invention, it is possible to manufacture tires which are suitable for mounting on rims of the above-mentioned type, using the new constructional ideas developed by the same Applicant and forming the subject of the already cited co-pending European patent applications Nos. 97830731.2 (EP 0928680), 97830733.8 (EP 928702) and 98830472.1 (EP 0976535) and therefore exploit all the advantageous aspects thereof in relation to the known manufacturing processes.

It must be pointed out, in fact, that, as a result of the constructional and structural design of the tire in question, especially with reference to its carcass structure 2, it is possible to achieve notable improvements in terms of structural strength—in particular in the vicinity of the beads, where a greater structural strength is normally required—as well as in terms of performance, in particular with regard to the effects of lateral thrust which occur during travel around bends.

In this context, a further advantage offered by the tires according to the invention, substantially arising from the replacement of the traditional one-piece bead core with the new multiple-turn bead cores, is that of allowing the use of mounting rims of the type mentioned, with symmetrical bead seats, i.e. with the same fitting diameter, in combination with a central well having a minimum depth, and preferably without axially internal bead-unseating safety humps, or with humps having a minimum depth. In particular, the constructional characteristics of the annular reinforcing structures and the methods with which they are integrated into the carcass ply are such as to increase further the structural strength of the tire 1 in the zones of the beads and the side walls.

In fact, the presence of the circumferentially unextendable annular inserts 19, 23 intimately joined to the carcass ply or carcass plies 3 provides an excellent "bond" with the filament-like elements of the various series of elongated sections 13, 14. The carcass structure 2 is thus strengthened in the zones corresponding to the beads of the tire 1 without requiring for this purpose the use of additional elongated inserts, usually called "flippers", which are looped back around the annular reinforcing structures 4 and which-are used instead in the known art.

In particular, the elimination of the axial backfolds of the terminal zones of the carcass ply, with the consequent elimination of the movements coaxial with the toroidal support and the devices designed to perform the corresponding process steps, has made the tire manufacturing process simpler, faster and more economical and has also made it possible to eliminate, from the tire structure, an element of discontinuity which has been the cause of significant problems in the vulcanized tire and during operation.

What is claimed is:

1. A tire for a vehicle wheel, comprising:
   a carcass structure;
   a belt structure applied to the carcass structure at a circumferentially-outer position of the carcass structure;
   a tread band applied to the belt structure at a circumferentially-outer position of the belt structure; and
   at least one pair of sidewalls applied to the carcass structure at laterally-opposite positions of the carcass structure;
   wherein the carcass structure comprises at least one carcass ply comprising terminal zones engaged with respective annular reinforcing structures,
   wherein the annular reinforcing structures are axially spaced apart from each other, and
   wherein at least one of the annular reinforcing structures comprises:
      at least one circumferentially-inextensible annular anchoring insert; and
      at least one stiffening element;
   wherein the at least one annular anchoring insert comprises a cross-sectional profile of flattened conformation, extending away from an equatorial plane of the tire,
   wherein the at least one stiffening element is applied against at least one of the terminal zones, and
   wherein the at least one stiffening element comprises at least one main portion with a cross-sectional profile tapering away from a rotation axis of the tire.

2. The tire of claim 1, wherein each annular anchoring insert extends in a direction converging toward the rotation axis of the tire, and
   wherein each annular anchoring insert extends in a direction away from the equatorial plane of the tire.

3. The tire of claim 1 wherein the at least one annular anchoring insert and the at least one stiffening element are substantially rigidly connected to each other.

4. The tire of claim 1, wherein a cross-sectional profile of each annular reinforcing structure comprises a geometric center of gravity located so that an inflating pressure of the tire generates a tension along the at least one carcass ply, and
   wherein the tension generated pushes an axially-outer end edge of the at least one annular anchoring insert toward the rotation axis of the tire.

5. The tire of claim 1, wherein a cross-sectional profile of each annular reinforcing structure comprises a geometric center of gravity located at:
   an axially-outer position relative to the at least one stiffening element, and
   an axially-inner position relative to an axially-outer end edge of the at least one annular anchoring insert.

6. The tire of claim 1, wherein the at least one carcass ply comprises a first part defining axially-inner terminal zones, and
   wherein the at least one carcass ply comprises a second part defining axially-outer terminal zones.

7. The tire of claim 6, wherein the at least one stiffening element is axially interposed between a respective axially-inner terminal zone and a corresponding axially-outer terminal zone of the at least one carcass ply.

8. The tire of claim 6, wherein the at least one annular anchoring insert is applied against an end portion of an axially-inner terminal zone, extending away from the equatorial plane of the tire.

9. The tire of claim 8, wherein the at least one annular anchoring insert is applied at a radially-outer position relative to the end portion of the axially-inner terminal zone.

10. The tire of claim 6, wherein the at least one annular anchoring insert is applied against an end portion of at least one axially-inner terminal zone, extending away from the equatorial plane of the tire.

11. The tire of claim 10, wherein the at least one annular anchoring insert is applied at a radially-outer position relative to the end portion of the at least one axially-inner terminal zone.

12. The tire of claim 11, wherein an end portion of at least one axially-outer terminal zone is applied in a radially-superposed relationship relative to the end portion of the at least one axially-inner terminal zone.

13. The tire of claim 1, wherein the at least one stiffening element comprises at least one annular body of elastomer material.

14. The tire of claim 13, wherein the at least one annular body comprises a hardness greater than or equal to 48° Shore D.

15. The tire of claim 1, wherein the at least one annular anchoring insert is located substantially close to an inner circumferential edge of the at least one main portion of the at least one stiffening element.

16. The tire of claim 1, wherein the at least one stiffening element comprises, at a radially-inner position, an extended portion substantially stretching out parallel to the at least one annular anchoring insert.

17. The tire of claim 1, further comprising at least one additional annular insert extending substantially parallel to the at least one annular anchoring insert.

18. The tire of claim 17, wherein the at least one additional annular insert is applied against an end portion of at least one axially-outer terminal zone, extending away from the equatorial plane of the tire.

19. The tire of claim 18, wherein the at least one additional annular insert is applied at a radially-outer position relative to the end portion of the at least one axially-outer terminal zone.

20. The tire of claim 1, wherein the at least one carcass ply comprises at least one first series of elongated sections, circumferentially distributed around the rotation axis of the tire, and wherein each elongated section of the at least one first series extends in a U-shaped configuration around a cross-sectional profile of the carcass structure to define two first side portions, mutually spaced apart in an axial direction, and a first crown portion, extending at a radially-outer position between the first side portions.

21. The tire of claim 20, wherein the at least one carcass ply further comprises at least one second series of elongated sections, circumferentially distributed around the rotation axis of the tire in an alternate sequence relative to the elongated sections of the at least one first series, and wherein each elongated section of the at least one second series extends in a U-shaped configuration around the cross-sectional profile of the carcass structure to define two second side portions, mutually spaced apart in an axial direction, and a second crown portion, extending at a radially-outer position between the second side portions, wherein axially-inner terminal zones of the carcass ply are defined on the first side portions of the elongated sections of the at least one first series, and wherein axially-outer terminal zones of the carcass ply are defined on the second side portions of the elongated sections of the at least one second series.

22. The tire of claim 11, further comprising at least one circumferentially-inextensible additional annular insert comprising a cross-sectional profile extending radially against an axially-inner wall of the at least one main portion of the at least one stiffening element.

23. The tire of claim 1, wherein the at least one stiffening element is located at an axially-outer position relative to the at least one carcass ply.

24. A wheel for a vehicle, comprising:
a rim; and
a tire mounted on the rim;
wherein the tire comprises a toroidal carcass structure, comprising:
  a crown portion;
  a pair of axially-opposite sidewalls; and
  beads for engagement with corresponding bead seats formed on the rim;
wherein the carcass structure comprises at least one carcass ply comprising terminal zones engaged with respective annular reinforcing structures axially spaced apart from each other,
wherein a radially-external surface of the rim comprises two lateral portions designed to form the bead seats,
wherein the lateral portions are defined by frustoconical surfaces converging toward an axis of rotation of the rim and away from an equatorial plane of the rim, and
wherein at least one of the annular reinforcing structures comprises:
  at least one stiffening element applied against the at least one carcass ply; and
  at least one circumferentially-inextensible annular anchoring insert;
wherein the at least one stiffening element comprises at least one main portion comprising a cross-sectional profile tapering away from a rotation axis of the tire,
wherein the at least one annular anchoring insert is formed by winding at least one continuous filament element in coaxial turns, and wherein at least one of the bead seats comprises a projection high enough to prevent unseating of a respective bead of the tire.

25. The wheel of claim 24, wherein the at least one anchoring insert comprises a cross-sectional profile of flattened conformation, extending axially away from the at least one main portion of the at least one stiffening element, wherein at least one of the bead seats is delimited toward the equatorial plane of the rim by the projection, and wherein the projection comprises a radial diameter greater than or equal to a radially-external diameter of an axially-innermost turn of the at least one anchoring insert.

26. The wheel of claim 24 or 25, further comprising:
an additional annular insert;
wherein the additional annular insert comprises a cross-sectional profile comprising radially-concentric turns extending radially against a wall of the at least one main portion of the at least one stiffening element, and
wherein the projection comprises a radial diameter not greater than a radially-external diameter of a radially-innermost turn of the additional annular insert.

27. The wheel of claim 24, wherein a radially-external surface of the rim comprises a central portion, wherein a radially-external profile of the central portion is symmetrical with respect to the equatorial plane of the rim wherein the radially-external profile defines a central well axially delimited by the bead seats, and wherein the central well comprises a minimum radial diameter less than a minimum radial diameter of the bead seats.

28. The wheel of claim 24, further comprising:
an inner tube inserted into a toroidal cavity of the tire;
wherein the inner tube is elastically expandable by introducing pressurized fluid into an internal volume of the inner tube,
wherein the inner tube comprises at least two circumferential volumes separated from and independent of one another,
wherein the at least two volumes are separated by a longitudinal wall extending in a plane perpendicular to an axis of rotation of the wheel,
wherein each of the at least two volumes comprise an inflation and deflation device contained in a wall of the inner tube, and
wherein the inner tube does not comprise any connection with the rim adapted to fix a circumferential position of the inner tube with respect to the rim.

29. A method of manufacturing a tire for a vehicle wheel, comprising:
making a carcass structure;
applying a belt structure to the carcass structure at a circumferentially-outer position of the carcass structure;
applying a tread band to the belt structure at a circumferentially-outer position of the belt structure; and
applying at least one pair of sidewalls to the carcass structure at laterally-opposite positions of the carcass structure;
wherein the carcass structure comprises at least one carcass ply comprising terminal zones,
wherein the terminal zones are engaged with respective annular reinforcing structures, wherein the annular reinforcing structures are axially spaced apart from each other, and wherein making the carcass structure comprises:

applying at least one first part of the at least one carcass ply on a toroidal support;

applying at least one circumferentially-inextensible annular anchoring insert in radial-superposition relationship with an end portion of at least one of the terminal zones; and applying at least one stiffening element against at least one of the terminal zones;

wherein a shape of the toroidal support corresponds to a shape of an inner surface of the tire, wherein the at least one annular anchoring insert comprises a cross-sectional profile of flattened conformation, extending away from an equatorial plane of the tire, wherein the at least one stiffening element comprises at least one main portion with a cross-sectional profile tapering away from a rotation axis of the tire, and wherein the at least one main portion is located substantially at an axially-inner position relative to the at least one annular anchoring insert.

30. The method of claim 29, wherein applying the annular anchoring insert comprises winding up at least one thread element in concentric turns, located axially in side-by-side relationship, around the toroidal support.

31. The method of claim 29, wherein applying the at least one first part comprises laying down at least one first series of elongated sections, circumferentially distributed on the toroidal support, and wherein each elongated section of the at least one first series extends in a U-shaped configuration around a cross-sectional profile of the toroidal support to define two first side portions, mutually spaced apart in an axial direction, and a first crown portion, extending at a radially-outer position between the first side portions.

32. The method of claim 29, wherein applying the at least one stiffening element is carried out before applying the at least one annular anchoring insert.

33. The method of claim 29, wherein the carcass structure is made substantially in an absence of movements both:

directed parallel to a rotation axis of the toroidal support; and aimed at axially turning up an end portion of the at least one carcass ply toward the equatorial plane of the tire.

34. The method of claim 29, further comprising:

applying at least one second part of the at least one carcass ply on the toroidal support;

wherein the at least one first part defines axially-inner terminal zones of the at least one carcass ply, wherein the at least one second part defines axially-outer terminal zones of the at least one carcass ply, and wherein the axially-outer terminal zones are located at an axially-outer position relative to the axially-inner terminal zones.

35. The method of claim 34, wherein applying the at least one second part is carried out after applying the at least one stiffening element, so that at least one of the axially-outer terminal zones is superposed on a respective stiffening element on an opposite side relative to a respective axially-inner terminal zone.

36. The method of claim 34, wherein an end portion of at least one of the axially-outer terminal zones is located against an extended portion of a respective stiffening element, extending substantially parallel to a respective annular anchoring insert.

37. The method of claim 34, further comprising:

applying at least one circumferentially-inextensible additional annular insert in radial-superposition relationship with an end portion of at least one of the axially-outer terminal zones;

wherein the at least one additional annular insert extends substantially parallel to the at least one annular anchoring insert.

38. The method of claim 37, wherein applying the at least one additional annular insert comprises winding up at least one thread element in concentric turns, located axially in side-by-side relationship, around the toroidal support.

39. The method of claim 34 wherein applying the at least one second part comprises laying down at least one second series of elongated sections, circumferentially distributed on the toroidal support, and wherein each elongated section of the at least one second series extends in a U-shaped configuration around a cross-sectional profile of the toroidal support to define two second side portions, mutually spaced apart in an axial direction, and a second crown portion, extending at a radially-outer position between the second side portions.

40. The method of claim 31 or 39, wherein the elongated sections of the at least one first series are laid down at a circumferential pitch greater than a width of the elongated sections of the at least one first series, and wherein each elongated section of the at least one second series is laid down with the second crown portion in a space existing between two contiguous elongated sections of the at least one first series to form the at least one carcass ply.

41. The method of claim 34, wherein applying the at least one second part is carried out before applying the at least one annular anchoring insert.

42. The method of claim 41, wherein the at least one annular anchoring insert is applied in a radially-superposed relationship with an end portion of a respective axially-outer terminal zone.

43. The method of claim 41, wherein, during applying the at least one second part, one end portion of each axially-outer terminal zone is located against an end portion of a respective axially-inner terminal zone, extending away from the equatorial plane of the tire.

44. The method of claim 34, wherein applying the at least one second part is carried out before applying the at least one stiffening element, so that at least one of the axially-outer terminal zones is interposed between a respective axially-inner terminal zone and a respective stiffening element.

45. A method of manufacturing a tire for a vehicle wheel, comprising:

making a carcass structure;

applying a belt structure to the carcass structure at a circumferentially-outer position of the carcass structure;

applying a tread band to the belt structure at a circumferentially-outer position of the belt structure; and applying at least one pair of sidewalls to the carcass structure at laterally-opposite positions of the carcass structure;

wherein the carcass structure comprises at least one carcass ply comprising terminal zones, wherein the terminal zones are engaged with respective annular reinforcing structures, wherein the annular reinforcing structures are axially spaced apart from each other, and wherein making the carcass structure comprises:

applying at least one first part of the at least one carcass ply on a toroidal support;

applying at least one circumferentially-inextensible annular anchoring insert in radial-superposition relationship with an end portion of at least one of the terminal zones;

applying at least one stiffening element against at least one of the terminal zones; and applying at least one circumferentially-inextensible additional annular insert, comprising a cross-sectional profile of flattened conformation, radially extending against an axially-inner wall of the at least one main portion of the at least one stiffening element;

wherein a shape of the toroidal support corresponds to a shape of an inner surface of the tire, wherein the at least one annular anchoring insert comprises a cross-sectional profile of flattened conformation, extending away from an equatorial plane of the tire, wherein the at least one stiffening element comprises at least one main portion with a cross-sectional profile tapering away from a rotation axis of the tire, and wherein the at least one main portion is located substantially at an axially-inner position relative to the at least one annular anchoring insert.

46. The method of claim 45, wherein each additional annular insert is applied against one of the axially-inner terminal zones before applying a respective stiffening element.

47. The method of claim 45, wherein applying each additional annular insert comprises winding up at least one thread element in concentric turns, located radially in side-by-side relationship, around the toroidal support.

48. A method of manufacturing a tire for a vehicle wheel, comprising:

making a carcass structure;

applying a belt structure to the carcass structure at a circumferentially-outer position of the carcass structure;

applying a tread band to the belt structure at a circumferentially-outer position of the belt structure; and applying at least one pair of sidewalls to the carcass structure at laterally-opposite positions of the carcass structure;

wherein the carcass structure comprises at least one carcass ply comprising terminal zones, wherein the terminal zones are engaged with respective annular reinforcing structures, wherein the annular reinforcing structures are axially spaced apart from each other, and wherein making the carcass structure comprises:

sequentially laying down on a toroidal support a first plurality of elongated sections, circumferentially distributed and adapted to form at least one first part of the at least one carcass ply;

winding up at least one circumferentially-inextensible annular anchoring insert in a circumferential direction relative to the toroidal support;

laying down at least one stiffening element in a circumferential direction relative to the toroidal support; and sequentially laying down on the toroidal support a second plurality of elongated sections, circumferentially distributed and adapted to form at least one second part of the at least one carcass ply;

wherein a shape of the toroidal support corresponds to a shape of an inner surface of the tire, wherein the at least one first part defines axially-inner terminal zones of the at least one carcass ply, wherein the at least one annular anchoring insert is in radially-superposed relationship with an end portion of at least one of the axially-inner terminal zones, wherein the at least one annular anchoring insert comprises a cross-sectional profile of flattened conformation, extending away from an equatorial plane of the tire, wherein the at least one stiffening element comprises at least one main portion with a cross-sectional profile tapering away from a rotation axis of the tire, wherein the at least one main portion is located substantially at an axially-inner position relative to the at least one annular anchoring insert, wherein the at least one second part defines axially-outer terminal zones of the at least one carcass ply, and wherein each elongated section of the second plurality is superposed on a respective stiffening element on a side axially opposite to a corresponding axially-inner terminal zone.

* * * * *

UNITED STATES PATENT AND TRADEMARK OFFICE
CERTIFICATE OF CORRECTION

PATENT NO.    : 6,789,590 B2
DATED         : September 14, 2004
INVENTOR(S)   : Renato Caretta It is certified that error appears in the above-identified patent and that said Letters Patent is hereby corrected as shown below:

Column 21,
Line 29, "claim 11" should read -- claim 1 --.

Signed and Sealed this

Twenty-second Day of March, 2005

JON W. DUDAS
*Director of the United States Patent and Trademark Office*